US008686133B2

(12) United States Patent
Kuboshima et al.

(10) Patent No.: US 8,686,133 B2
(45) Date of Patent: Apr. 1, 2014

(54) OXO-TITANYLPHTHALOCYANINE CRYSTAL, METHOD FOR PRODUCING THE SAME AND ELECTROPHOTOGRAPHIC PHOTORECEPTOR

(75) Inventors: Daisuke Kuboshima, Osaka (JP); Jun Azuma, Osaka (JP); Yoshio Inagaki, Osaka (JP); Junichiro Otsubo, Osaka (JP); Keiji Maruo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/546,077

(22) Filed: Jul. 11, 2012

(65) Prior Publication Data

US 2012/0296082 A1 Nov. 22, 2012

Related U.S. Application Data

(60) Continuation of application No. 12/924,710, filed on Oct. 1, 2010, now Pat. No. 8,242,261, which is a division of application No. 11/827,115, filed on Jul. 10, 2007, now abandoned.

(30) Foreign Application Priority Data

Jul. 31, 2006 (JP) .................................. 2006-208019

(51) Int. Cl.
*C09B 47/067* (2006.01)
(52) U.S. Cl.
USPC ........................................................ 540/139
(58) Field of Classification Search
USPC ........................................................ 540/139
See application file for complete search history.

(56) References Cited

U.S. PATENT DOCUMENTS 5,190,839 A * 3/1993 Fujimaki et al. ................ 430/78

FOREIGN PATENT DOCUMENTS

EP 0 404 131 A2 12/1990
(Continued)

OTHER PUBLICATIONS

Machine English language translation of JP 5320167, Dec. 1993.*

(Continued)

*Primary Examiner* — Hoa V Le
(74) *Attorney, Agent, or Firm* — Carmody Torrance Sandak & Hennessey LLP

(57) ABSTRACT

The invention provides an oxo-titanylphthalocyanine crystal which is stable, is superior in dispersibility in a photoreceptive layer and efficiently contributes to improvements in sensitivity and charge retention rate of an electrophotographic photoreceptor when it is used as a charge generating agent, a method for producing the oxo-titanylphthalocyanine crystal, and an electrophotographic photoreceptor. The oxo-titanylphthalocyanine crystal has predetermined optical characteristics and thermal properties and is produced by a production method including the following steps (a) to (d): (a) a step of dissolving a crude oxo-titanylphthalocyanine crystal in an acid to obtain an oxo-titanylphthalocyanine solution; (b) a step of adding the oxo-titanylphthalocyanine solution dropwise in a poor solvent to obtain a wet cake; (c) a step of washing the wet cake with an alcohol having 1 to 4 carbon atoms; and (d) a step of stirring the washed wet cake under heating in a nonaqueous solvent to obtain an oxo-titanylphthalocyanine crystal.

8 Claims, 8 Drawing Sheets

(56) References Cited

FOREIGN PATENT DOCUMENTS

| | | | |
|---|---|---|---|
| EP | 0 832 941 A1 | 4/1998 | |
| EP | 1 093 025 A2 | 4/2001 | |
| EP | 1 788 037 A1 | 5/2007 | |
| GB | 2 275 687 | 9/1994 | |
| JP | 5320167 * | 12/1993 | ............... G03G 5/06 |
| JP | 08-176456 | 7/1996 | |
| JP | 08-283599 | 10/1996 | |
| JP | 9120166 * | 5/1997 | ............... G03G 5/06 |
| JP | 3463032 B | 8/2003 | |
| JP | 2004-145284 | 5/2004 | |

OTHER PUBLICATIONS

Machine English language translation of JP 9120166, May 1997.*

* cited by examiner

Fig.6
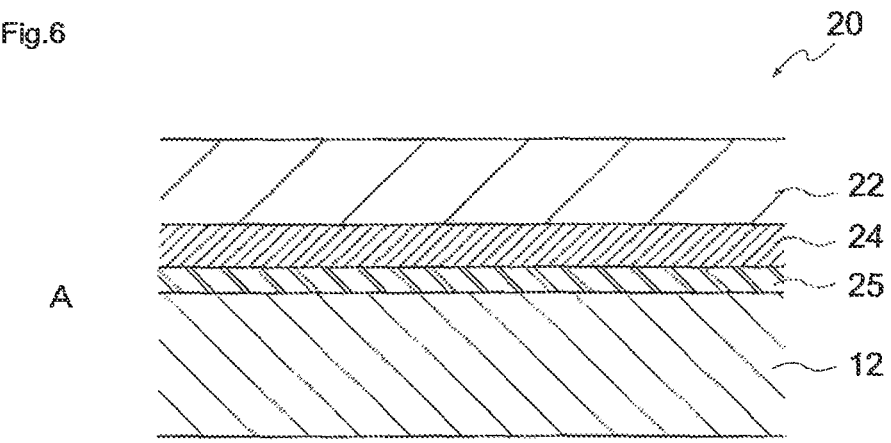
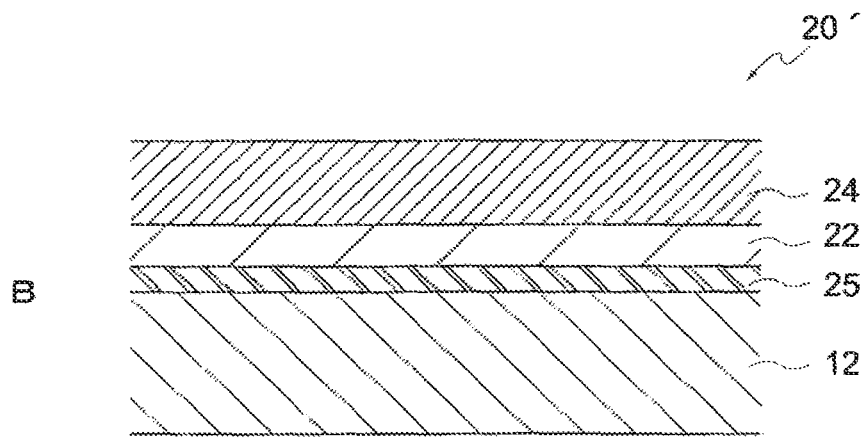

OXO-TITANYLPHTHALOCYANINE CRYSTAL, METHOD FOR PRODUCING THE SAME AND ELECTROPHOTOGRAPHIC PHOTORECEPTOR

CROSS REFERENCE TO RELATED APPLICATIONS

This application is a continuation of U.S. application Ser. No. 12/924,710, filed on Oct. 1, 2010, now U.S. Pat. No. 8,242,261, which is a divisional of U.S. application Ser. No. 11/827,115, filed Jul. 10, 2007, now abandoned, the subject matter of each of which is herein incorporated by reference in its entirety.

BACKGROUND OF THE INVENTION

1. Field of the Invention

The present invention relates to an oxo-titanylphthalocyanine crystal formed from an oxo-titanylphthalocyanine compound, a method for producing the oxo-titanylphthalocyanine crystal, and an electrophotographic photoreceptor. In particular, the invention relates to an oxo-titanylphthalocyanine crystal which is stable, is superior in dispersibility in a photoreceptive layer and efficiently contributes to improvements in sensitivity and charge retention rate in en electrophotographic photoreceptor, a method for producing the oxo-titanylphthalocyanine crystal, and an electrophotographic photoreceptor.

2. Description of the Related Art

Generally, as electrophotographic photoreceptors for use in electrophotographic devices such as copying machines and laser printers, many organic photoreceptors have been used to cope with, for example, demands for low costs and a resistance to environmental pollution. As charge generating agents for use in such organic photoreceptors, widely used are phthalocyanine type pigments sensitive to infrared or near-infrared light emitted from a semiconductor laser, infrared LED or the like.

Also, it is known that such phthalocyanine type pigments include non-metal phthalocyanine compounds, copper phthalocyanine compounds, titanylphthalocyanine compounds and the like depending on their chemical structures, and also, each phthalocyanine compound can take various crystal forms by a difference in production conditions.

It is known that when an electrophotographic photoreceptor using oxo-titanylphthalocyanine compound having a Y-type crystal structure as the charge generating agent is produced in the presence of many types of phthalocyanine compound crystals differing in crystal type, electric characteristics in the electrophotographic photoreceptor are more improved as compared with the case of using oxo-titanylphthalocyanine having other crystal types.

With regard to the Y-type oxo-titanylphthalocyanine crystal, a method for producing an oxo-titanylphthalocyanine crystal having a maximum diffraction peak at a Bragg angle $(2\theta\pm0.2°)=27.3°$ with respect to CuKα ray in an X-ray diffraction spectrum is disclosed, wherein an organic compound capable of forming a phthalocyanine ring and a titanium compound are made to react with each other at 130° C. for about 4 hours in dialkylamino alcohol to which urea or ammonia is added (for example, refer to the following patent document 1).

Also, a method for producing an oxo-titanylphthalocyanine crystal is disclosed in which o-phthalonitrile is made to react directly with titanium tetrabutoxide without using a urea compound at 215° C. for about 2 hours (for example, refer to the following patent documents 2 and 3).

More specifically, disclosed is a method for producing an oxo-titanylphthalocyanine crystal having a peak in a predetermined range in a CuKα characteristic X-ray diffraction spectrum and no temperature variation peak in a temperature range from 50 to 400° C. in differential scanning calorimetric analysis.

However, in the case of the patent document 1, the addition proportion of the titanium compound to the organic compound capable of forming a phthalocyanine ring is small whereas the addition proportion of urea and the like to the organic compound capable of forming a phthalocyanine ring is excessive and also, reaction temperature is low. There is therefore the problem that produced Y-type oxo-titanylphthalocyanine crystals tend to undergo crystal transition, into β-type or α-type crystals in a photoreceptive layer application liquid. For this reason, the photoreceptive layer application liquid is deteriorated in storage stability, with the result that there is the problem that no photoreceptive layer having good electric properties can be stably formed.

On the other hand, in the case of using the oxo-titanylphthalocyanine crystals described in the patent documents 2 and 3, there is a problem concerning low dispersibility in a photoreceptive layer though the crystal transition in the photoreceptive layer application liquid can be suppressed to some extent. As a result, there are problems concerning reduced sensitivity and reduced charge retention rate in electrophotographic photoreceptors using the oxo-titanylphthalocyanine crystals as charge generating agents.

[Patent document 1] JP-A H08-176456 (examples)
[Patent document 2] JP 3463032 (claims)
[Patent document 3] JP-A 2004-145284 (claims)

SUMMARY OF THE INVENTION

In view of this situation, the inventors of the present invention have made earnest studies concerning the above problems, and as a result, found that an oxo-titanylphthalocyanine crystal which is stable and is superior in dispersibility in a photoreceptive layer can be obtained by washing a wet cake, which is an intermediate product, with a predetermined alcohol in a process of producing an oxo-phthalocyanine crystal having predetermined optical characteristics and thermal stability.

Specifically, it is an object, of the present invention to provide an oxo-titanylphthalocyanine crystal which is stable, is superior in dispersibility in a photoreceptive layer and efficiently contributes to improvements in sensitivity and charge retention rate of an electrophotographic photoreceptor when it is contained in the electrophotographic photoreceptor as a charge generating agent, a method for producing the oxo-titanylphthalocyanine crystal, and an electrophotographic photoreceptor.

According to an aspect of the present invention, there is provided an oxo-titanylphthalocyanine crystal having a maximum diffraction peak at a Bragg angle $(2\theta\pm0.2°)=27.2°$ in the CuKα characteristic X-ray diffraction, spectrum and one peak in a temperature range from 270 to 400° C. other than the peak derived from vaporization of adsorbed water in differential scanning calorimetric analysis, the oxo-titanylphthalocyanine crystal being produced by a production method including the following steps (a) to (d), whereby the aforementioned problem can be solved:

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

Crystal transition to an α-type crystal and β-type crystal can be efficiently suppressed even when the oxo-titanylphthalocyanine crystal is dipped for a term as long as 7 days or more, for example, insofar as it has predetermined optical characteristics and thermal characteristics.

The oxo-titanylphthalocyanine crystal can improve dispersibility in the photoreceptive layer insofar as it is produced through the predetermined process.

The effect of improving dispersibility is considered to be obtained by washing the wet cake with a predetermined alcohol in the step (c), thereby reforming the surface characteristics of the oxo-titanylphthalocyanine crystal.

In any case, the oxo-titanylphthalocyanine crystal of the present invention is stable and is superior in dispersibility in the photoreceptive layer, and therefore, efficiently contributes to improvements in sensitivity and charge retention rate of an electrophotographic photoreceptor when it is contained in the electrophotographic photoreceptor as a charge generating agent.

The wet cake shows the condition that oxo-phthalocyanine is dispersed in a relatively small amount of, for example, water and has a block form.

Also, when constituting the oxo-titanylphthalocyanine crystal, of the invention, the production method preferably includes the following inspection steps (e) to (g) after the step (d):

(e) a step of adding the oxo-titanylphthalocyanine crystal in an amount by weight of 1.25 parts based on 100 parts by weight of a mixed solvent of methanol and N,N-dimethylformamide (methanol:N,N-dimethylformamide=1:1 (by weight ratio)) to prepare a suspension;

(f) a step of filtering the suspension with a filter to obtain a filtrate; and (g) a step of confirming that the absorbance of the filtrate for light having a wavelength of 400 nm is a value in a range from 0.01 to 0.08.

Such a constitution ensures that when the absorbance of the filtrate is measured, the dispersibility of the oxo-titanylphthalocyanine crystal in the photoreceptive layer can be evaluated easily and quantitatively.

The reason why the absorbance for light having a wavelength of 400 nm is measured as an index of dispersibility is that a correlation among the absorbance for the light having such a wavelength, the dispersibility of the oxo-titanylphthalocyanine crystal and the electric characteristics of the electrophotographic photoreceptor caused by the dispersibility has been empirically found.

Also, such a correlation is considered to be created because the condition of reformation of surface characteristics of the oxo-titanylphthalocyanine crystal is reflected on the absorbance for the light having a wavelength of 400 nm.

Further, when the oxo-titanylphthalocyanine crystal of the invention is constituted, the acid used in the step (a) is preferably at least one type selected from the group consisting of concentrated sulfuric acid, trifluoroacetic acid and sulfonic acid.

With such a constitution, impurities can be decomposed efficiently by such an acid whereas the decomposition of the oxo-titanylphthalocyanine compound can be suppressed with high efficiency.

Furthermore, when constituting the oxo-titanylphthalocyanine crystal of the invention, the poor solvent used in the step (b) is preferably water.

With such a constitution, the surface area of the wet cake obtained can be increased, which allows the dispersibility of the oxo-titanylphthalocyanine crystal in the photoreceptive layer to be improved more efficiently in the subsequent washing step.

Moreover, when she oxo-titanylphthalocyanine crystal of the invention is constituted, the alcohol having 1 to 4 carbon atoms which is used in the step (c) is preferably at least one type selected from the group consisting of methanol, ethanol and 1-propanol.

Such a constitution makes it possible to even more efficiently improve the dispersibility of the oxo-titanylphthalocyanine crystal in the photoreceptive layer.

Also, when the oxo-titanylphthalocyanine crystal of the invention is constituted, it is preferable that the wet cake is washed with an alcohol having 1 to 4 carbon atoms and then, further washed with water in the step (c).

Such a constitution effectively suppresses the crystal transition of the oxo-titanylphthalocyanine crystal more efficiently, so that a more stable oxo-titanylphthalocyanine crystal can be obtained.

Also, when the oxo-titanylphthalocyanine crystal of the invention is constituted, the oxo-titanylphthalocyanine crystal preferably has a maximum diffraction peak at a Bragg angle $(2\theta \pm 0.2°)=27.2°$ in the CuKα characteristic X-ray diffraction spectrum measured after the crystal is dipped in an organic solvent for 24 hours and no peak at 26.2°.

Such a constitution enables a further improvement in the stability of the oxo-titanylphthalocyanine crystal in the photoreceptive layer application liquid.

According to another aspect of the present invention, there is provided a method for producing an oxo-titanylphthalocyanine crystal, the oxo-titanylphthalocyanine crystal having a maximum diffraction peak at a Bragg angle $(2\theta \pm 0.2°)=27.2°$ in the CuKα characteristic X-ray diffraction spectrum and one peak in a temperature range from 270 to 400° C. other than the peak derived from vaporization of adsorbed water in differential scanning calorimetric analysis, the method including the following steps (a) to (d):

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

Specifically, an oxo-titanylphthalocyanine crystal having predetermined optical characteristics and thermal characteristics is produced through predetermined steps, which results in the production of an oxo-titanylphthalocyanine crystal which is stable and is superior in dispersibility in a photoreceptive layer, and therefore efficiently contributes to improvements in sensitivity and charge retention rate of an electrophotographic photoreceptor when it is contained in the electrophotographic photoreceptor as a charge generating agent.

Also, when executing the method for producing an oxo-titanylphthalocyanine crystal according to the invention, the method preferably includes the following inspection steps (e) to (g) after the step (d):

(e) a step of adding the oxo-titanylphthalocyanine crystal in an amount by weight of 1.25 parts based on 100 parts by weight of a mixed solvent of methanol and N,N-dimethylformamide (methanol:N,N-dimethylformamide=1:1 (by weight ratio)) to prepare a suspension;

(f) a step of filtering the suspension with a filter to obtain a filtrate; and (g) a step of confirming that the absorbance of the filtrate for light having a wavelength of 400 nm is a value in a range from 0.01 to 0.08.

Such a constitution ensures that when the absorbance of the filtrate is measured, the dispersibility of the oxo-titanylphthalocyanine crystal in the photoreceptive layer can be evaluated easily and quantitatively.

Accordingly, an oxo-titanylphthalocyanine crystal which is stable and is superior in dispersibility in the photoreceptive layer can be produced more stably.

According to a still another aspect of the present invention, there is provided an electrophotographic photoreceptor including a substrate and a photoreceptive layer containing a charge generating agent, a charge transfer agent and a binding resin formed on the substrate, wherein the charge generating agent is an oxo-titanylphthalocyanine having a maximum diffraction peak at a Bragg angle (2θ±0.2°)=27.2° in the CuKα characteristic X-ray diffraction spectrum and one peak in a temperature range from 270 to 400° C. other than the peak derived from vaporization of adsorbed water in differential scanning calorimetric analysis, the oxo-titanylphthalocyanine crystal being produced by the following steps (a) to (d):

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

Specifically, a predetermined oxo-titanylphthalocyanine crystal which is stable and is superior in dispersibility in the photoreceptive layer is contained as the charge generating agent, which enables an electrophotographic photoreceptor having excellent sensitivity and charge retention rate to be obtained.

Also, when the electrophotographic photoreceptor of the invention is constituted, the following relationship (1) is preferably established among the reflection absorbance (A/-) of the photoreceptive layer for light having a wavelength of 700 nm, the film thickness (d/m) of the photoreceptive layer and the concentration (C/wt. %) of the oxo-titanylphthalocyanine crystal in the photoreceptive layer.

$$A \cdot C^{-1} \cdot d^{-1} > 1.75 \times 10^{-4} \quad (1)$$

Such a constitution makes it possible to confirm with ease the dispersibility of the oxo-titanylphthalocyanine crystal in the photoreceptive layer.

BRIEF DESCRIPTION OF THE DRAWINGS

FIGS. 6A and 6B are views for explaining the configuration of a laminate type electrophotographic photoreceptor according to the present invention;

DESCRIPTION OF THE PREFERRED EMBODIMENTS

First Embodiment

Figure 1:
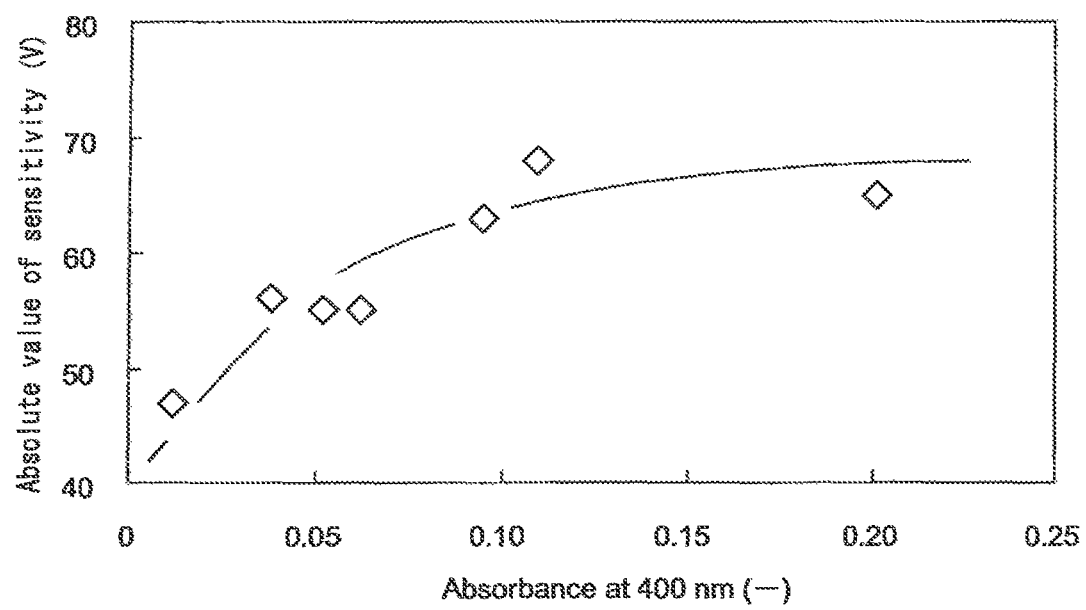
FIG. 1 is a graph for explaining the relationship between the absorbance and the sensitivity.

A first embodiment of the present invention relates to an oxo-titanylphthalocyanine crystal having a maximum diffraction peak at a Bragg angle (2θ±0.2°)=27.2° in a CuKα characteristic X-ray diffraction spectrum and one peak in a temperature range from 270 to 400° C. other than the peak derived from vaporization of adsorbed water in differential scanning calorimetric analysis, the oxo-titanylphthalocyanine crystal being produced by a production method including the following steps (a) to (d):

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

The oxo-titanylphthalocyanine crystal will be explained in more detail. The steps (a) to (d) writ be explained in the subsequent second embodiment, and in this first embodiment, the characteristics, etc. of the oxo-titanylphthalocyanine crystal itself will be explained.

1. Oxo-Titanylphthalocyanine Compound

As an oxo-titanylphthalocyanine compound constituting the oxo-titanylphthalocyanine crystal of the invention, compounds represented by the following formula (1) are preferable.

This is because an oxo-titanylphthalocyanine compound having such a structure not only enables further improvement in stability of the oxo-titanylphthalocyanine crystal but also enables such an oxo-titanylphthalocyanine crystal to be produced stably.

Also, particularly, the oxo-titanylphthalocyanine crystal preferably has a structure represented by the following formula (2). Among these compounds, unsubstituted oxo-titanylphthalocyanine compounds represented by the following formula (3) are particularly preferable.

This is because the use of an oxo-titanylphthalocyanine compound having such a structure makes it possible to more easily produce an oxo-titanylphthalocyanine crystal having more stable qualities:

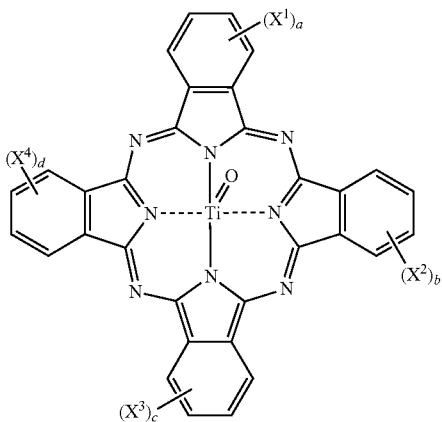

(1)

(In the general formula (1), $X^1$, $X^2$, $X^3$ and $X^4$, which may be the same or different substituents, each represents a hydrogen atom, a halogen atom, an alkyl group, an alkoxy group, a cyano group or a nitro group, and repeat units a, b, c and d, which may be the same or different, each denote an integer from 1 to 4.)

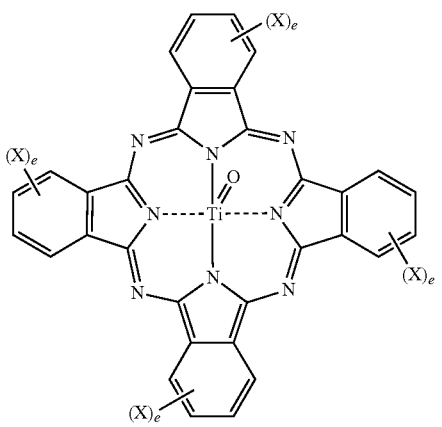

(2)

(In the general formula (2), X represents a hydrogen atom, a halogen atom, an alkyl group, an alkoxy group, a cyano group or a nitro group and a repeat unit e denotes an integer from 1 to 4.)

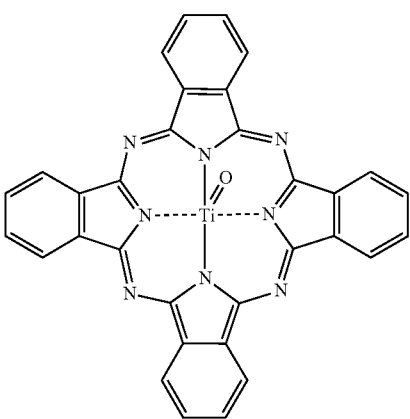

(3)

2. Oxo-Titanylphthalocyanine Crystal (1) Optical Characteristics

The oxo-titanylphthalocyanine crystal of the present invention is characterized by such optical characteristics that it has a maximum diffraction peak at a Bragg angle $(2\theta\pm0.2°)=27.2°$ in the CuKα characteristic X-ray diffraction spectrum (first optical characteristics).

It is preferable that the oxo-titanylphthalocyanine crystal of the invention has no peak at 26.2° in the CuKα characteristic X-ray diffraction spectrum (second optical characteristics).

It is also preferable that the oxo-titanylphthalocyanine crystal of the invention has no peak at a Bragg angle $(2\theta\pm0.2°)=7.2°$ in the CuKα characteristic X-ray diffraction spectrum (third, optical characteristics).

This is because if an oxo-titanylphthalocyanine crystal which is not provided with the first optical characteristics is used, there is a tendency that the stability of crystals in an organic solvent and charge generating ability are deteriorated more significantly than in the case of using an oxo-titanylphthalocyanine crystal provided with the first optical characteristics. Conversely speaking, this is because if an oxo-titanylphthalocyanine crystal is provided with the first optical characteristics, more preferably, the second and third characteristics, the stability of a crystal in an organic solvent and charge generating ability can be improved.

It is preferable that the oxo-titanylphthalocyanine crystal has a maximum diffraction peak at least at a Bragg angle $(2\theta\pm0.2°)=27.2°$ and no peak at a Bragg angle $(2\theta\pm0.2°)=26.2°$ in the CuKα characteristic X-ray diffraction spectrum measured after dipped for 24 hours in an organic solvent.

This reason is that when the oxo-titanylphthalocyanine crystal has such characteristics, the stability of the crystal with time and dispersibility of the crystal in the photoreceptive layer application liquid can be more improved.

Specifically, this is because it can be confirmed that even in the case of dipping the oxo-titanylphthalocyanine crystal for 24 hours in an organic solvent such as tetrahydrofuran in actual, the crystal type is not transited to an α or β-type but retains a predetermined crystal type, and it is therefore possible to control crystal transition in an organic solvent.

Note that the dipping experiment in an organic solvent for evaluation, which is a criterion for the evaluation of the storage stability of the oxo-titanylphthalocyanine crystal is preferably made in the same condition that is used to actually store, for example, a photoreceptive layer application liquid used to manufacture the electrophotographic photoreceptor (hereinafter referred to simply as photoreceptor application liquid). It is therefore preferable to evaluate the storage stability of the oxo-titanylphthalocyanine crystal in a closed system under the condition of a temperature of $23\pm1°$ C. and a relative humidity of 50 to 60% RH, for example.

Also, the organic solvent used when evaluating the storage stability of the oxo-titanylphthalocyanine crystal is preferably at least one type selected from the group consisting of tetrahydrofuran, dichloromethane, toluene, 1,4-dioxane and 1-methoxy-2-propanol.

This is because when such an organic solvent is used as the organic solvent in the photoreceptive layer application liquid, the stability of the oxo-titanylphthalocyanine crystal can be estimated more exactly, and also, the solvent is highly compatible with, for example, the oxo-titanylphthalocyanine crystal, charge transfer agent and binding resin. Accordingly, a photoreceptor that allows, for example, the oxo-titanylphthalocyanine crystal and charge transfer agent to exhibit their characteristics can be formed, and an electrophotographic photoreceptor superior in electric characteristics and image characteristics can be produced resultantly.

(2) Thermal Characteristics

The oxo-titanylphthalocyanine crystal according to the invention is also characterized by such thermal characteristics that it has one peak in a temperature range from 270 to 400° C. other than the peak derived from vaporization of adsorbed water in differential scanning calorimetric analysis.

This is because crystal transition of the crystal structure to an α-type crystal and β-type crystal can be efficiently suppressed even when the oxo-titanylphthalocyanine crystal is dipped in an organic solvent for a long term insofar as it has the aforementioned optical characteristics and thermal characteristics. Therefore, a photoreceptive layer application liquid superior in storage stability can be obtained by using such an oxo-titanylphthalocyanine crystal, with the result that an electrophotographic photoreceptor superior in electric characteristics and image characteristics can be stable produced.

The aforementioned one peak which is a peak other than the peak derived from the vaporization of adsorbed water and appears in a temperature range from 270 to 400° C. appears more preferably in a temperature range from 290 to 400° C. and still more preferably in a temperature range from 300 to 400° C.

A specific method for measuring the Bragg angle in the CuKα characteristic X-ray diffraction spectrum and a specific method of differential scanning calorimetric analysis will be explained in detail in Examples described later.

Second Embodiment

A second embodiment of the present invention relates to a method for producing en oxo-titanylphthalocyanine crystal having a maximum diffraction peak at a Bragg angle $(2\theta \pm 0.2°)=27.2°$ in a CuKα characteristic X-ray diffraction spectrum and one peak in a temperature range from 270 to 400° other than the peak derived from vaporization of adsorbed water in differential scanning calorimetric analysis, the method including the following steps (a to (d):

(a) a step of dissolving a crude oxo-titanylphthalocyanine crystal in an acid to obtain an oxo-titanylphthalocyanine solution;
(b) a step of adding the oxo-titanylphthalocyanine solution dropwise in a poor solvent to obtain a wet cake;
(c) a step of washing the wet cake with an alcohol having 1 to 4 carbon atoms; and
(d) a step of stirring the washed wet cake under heating in a nonaqueous solvent to obtain an oxo-titanylphthalocyanine crystal.

The content which has already been explained in the first embodiment will be properly omitted to explain the method for producing an oxo-titanylphthalocyanine compound according to the second embodiment.

1. Production of Oxo-Titanylphthalocyanine Compound

In the method for producing an oxo-titanylphthalocyanine compound, production materials of this molecule, specifically, o-phthalonitrile or its derivative, or 1,3-diiminoisoindoline or its derivative, titanium alkoxide or titanium tetrachloride are preferably made to rear with each other in the presence of a urea compound to produce an oxo-titanylphthalocyanine compound.

Specifically, the method is preferably performed according to the following reaction formula (1) or (2). In the reaction formula (1) or (2), titanium tetrabutoxide represented by the formula (5) is used as titanium alkoxide, by way of example.

(1) Reaction Formula

It is therefore preferable that o-phthalonitrile represented by the formula (4) is made to react, with titanium tetrabutoxide as the titanium alkoxide represented by the formula (5) as shown in the reaction formula (1) or 1,3-diiminoisoindoline represented by the formula (6) is made to react with titanium tetrabutoxide as the titanium alkoxide represented by the formula (5) as shown in the reaction formula (2), to produce an oxo-titanylphthalocyanine compound represented by the formula (3).

In this case, titanium tetrachloride may be used in place of the titanium alkoxide such as titanium tetrabutoxide represented by the formula (5).

Reaction Formula (1)

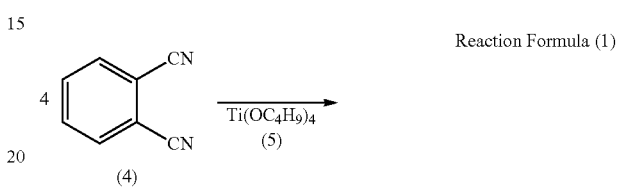

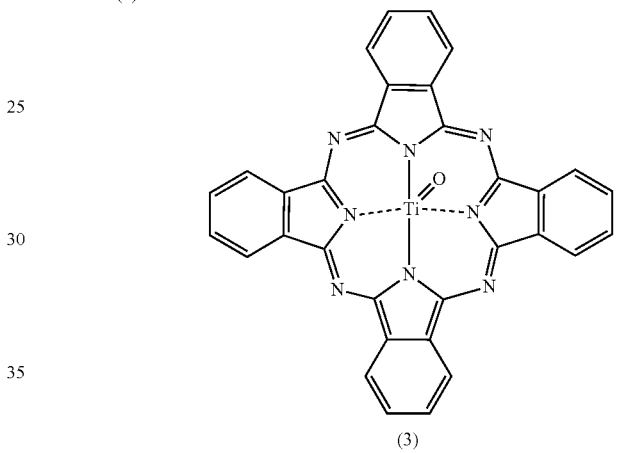

Reaction formula (2)

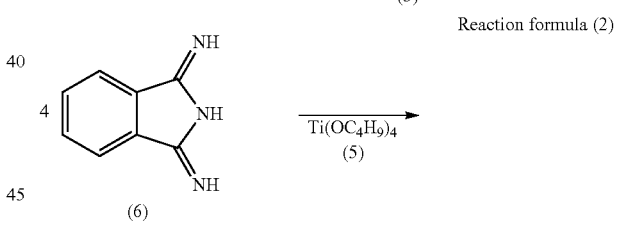

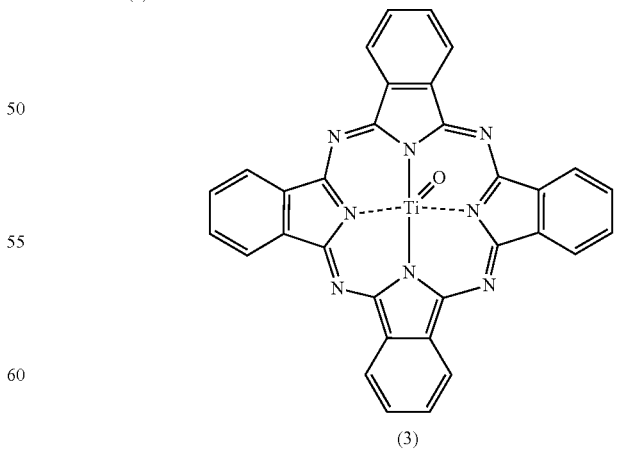

(2) Addition Quantity

The addition quantity of the titanium alkoxide such as titanium tetrabutoxide represented by the formula (5) or titanium tetrachloride is preferably a value ranging from 0.40 to 0.53 mol based on 1 mol of o-phthalonitrile represented by the formula (4) or its derivative or of 1,3-diiminoisoindoline represented by the formula (6) or its derivative.

This is because when the titanium alkoxide such as titanium tetrabutoxide represented by the formula (5) or titanium tetrachloride is added in an amount exceeding ¼ mol equivalents to o-phthalonitrile represented by the formula (4) or its derivative or to 1,3-diiminoisoindoline represented by the formula (6) or its derivative, an interaction with a urea compound which will be explained later is effected in an efficient manner. Such an interaction will be described in detail in the paragraph as to the urea compound.

Therefore, the addition quantity of the titanium alkoxide such as titanium tetrabutoxide represented by the formula (5) or titanium tetrachloride is more preferably a value ranging from 0.42 to 0.50 mol, and still more preferably a value ranging from 0.45 to 0.47 mol based on 1 mol of o-phthalonitrile represented by the formula (4) or 1,3-diiminoisoindoline represented by the formula (6), etc.

(3) Urea Compound

Also, the reaction represented by the above reaction formulae (1) and (2) is preferably made in the presence of a urea compound. This is because when an oxo-titanylphthalocyanine compound produced in the presence of a urea compound is used, an interaction between the urea compound and titanium alkoxide or titanium tetrachloride is effected to thereby obtain a specific oxo-titanylphthalocyanine crystal efficiently.

Specifically, the interaction means an action of the materials concerned on promotion of the reaction represented by the reaction formulae (1) and (2) wherein ammonia produced by the reaction of the urea compound with the titanium alkoxide or titanium tetrachloride further forms a complex with titanium alkoxide or titanium chloride and the complex more promotes the reaction. Such a promotion action makes it possible to efficiently produce an oxo-titanylphthalocyanine crystal resistant to crystal transition even in an organic solvent by reacting the raw materials.

(3)-1 Type

The urea compound to be used in the reaction formulae (1) and (2) is preferably at least one type selected from the group consisting of urea, thiourea, O-methylisourea sulfate, O-methylisourea carbonate and O-methylisourea hydrochloride.

This reason is that when such a urea compound is used as the urea compound shown in the reaction formulae (1) and (2), ammonia generated in the reaction process forms at complex in combination with titanium alkoxide or titanium tetrachloride more efficiently and the complex further promotes the reaction represented by the reaction formulae (1) and (2).

Specifically, ammonia generated by the reaction between titanium alkoxide or titanium tetrachloride as a raw material and a urea compound further efficiently forms a complex compound in combination with titanium alkoxide, etc. Therefore, the complex compound further promotes the reaction represented by the reaction formulae (1) and (2).

It has been clarified that such a complex compound tends to be produced peculiarly when the reaction is made at a temperature as high as 180° C. or more. For this reason, it is more effective to perform the reaction in a nitrogen-containing compound, for example, quinoline (boiling point: 237.1° C.) or isoquinoline (boiling point: 242.5° C.) or a mixture of them (by weight ratio: 10:90 to 90:10).

Among the aforementioned urea compounds, urea is more preferably used because ammonia which is a reaction accelerator and the complex compound generated by the aid of ammonia are generated more easily.

(3)-2 Addition Quantity

The addition quantity of the urea compound to be used in the reaction represented by the reaction formulae (1) and (2) is preferably a value in a range from 0.1 to 0.95 mol based on 1 mol of o-phthalonitrile or its derivative or 1,3-diiminoisoindoline or its derivative.

This is because the action of the urea compound described above can be exhibited when the addition quantity of the urea compound is made to fall in the above range.

Therefore, the addition quantity of the urea compound is more preferably a value in a range from 0.2 to 0.8 mol, and still more preferably a value in a range from 0.3 to 0.7 mol based on 1 mol of o-phthalonitrile or its derivative or 1,3-diiminoisoindoline or its derivative.

(4) Solvent

Examples of the solvent to be used in the reaction represented by the reaction formulae (1) and (2) include a single compound or a combination of two or more compounds selected from the group consisting of: hydrocarbon type solvents such as xylene, naphthalene, methylnaphthalene, tetralin and nitrobenzene; hydrocarbon halide type solvents such as dichlorobenzene, trichlorobenzene, dibromobenzene and chloronaphthalene; alcoholic solvents such and hexanol, octanol, decanol, benzyl alcohol, ethylene glycol and diethylene glycol; ketone type solvents such as cyclohexanone, acetophenone, 1-methyl-2-pyrrolidone and 1,3-dimethyl-2-imidazolidinone; amide type solvents such as formamide and acetamide; and nitrogen-containing solvents such as picoline, quinoline and isoquinoline.

Particularly, nitrogen-containing compounds having a boiling point of 180° C. or more, such as quinoline and isoquinoline, are preferable solvents because ammonia produced by the reaction of the titanium alkoxide or titanium tetrachloride as the raw material with the urea compound tends to form a complex with titanium alkoxide or the like more efficiently.

(5) Reaction Temperature

The temperature of the reaction represented by the reaction formulae (1) and (2) is preferably designed to be a temperature as high as 150° C. or more. This is because if the reaction temperature is less than 150° C., particularly 135° C. or less, titanium alkoxide or titanium tetrachloride as the raw material scarcely reacts with the urea compound, which makes it difficult to form a complex compound. This gives difficulty in producing the situation where the complex compound further promotes the reaction represented by the reaction formulae (1) and (2). It is therefore difficult to produce an oxo-titanylphthalocyanine crystal which is resistant to crystal transition even in an organic solvent in an efficient manner resultantly.

Accordingly, the temperature of the reaction represented by the reaction formulae (1) and (2) is more preferably a value in a range from 180 to 250° C., and still more preferably at value in a range from 200 to 240° C.

(6) Reaction Time

The reaction time in the reaction represented by the reaction formulae (1) and (2), though depending on the reaction temperature, is preferably in a range from 0.5 to 10 hours. This is because if the reaction time is less than 0.5 hours, the titanium alkoxide or titanium tetrachloride as the raw material scarcely reacts with the urea compound, thereby giving difficulty in forming a complex compound. This makes it difficult for the complex compound to further promote the reaction represented by the reaction formulae (1) and (2) with the result of difficulty in producing an oxo-titanylphthalocyanine crystal which is resistant to crystal transition even in an organic solvent in an efficient manner. If the reaction time exceeds 10 hours, on the other hand, this may be economically disadvantageous or the produced complex compound may be decreased.

Therefore, the reaction time in the reaction represented by the reaction formulae (1) and (2) is more preferably a value in a range from 0.6 to 3.5 hours, and still more preferably a value in a range from 0.8 to 3 hours.

2. Method for Producing an Oxo-Titanylphthalocyanine Crystal (1) Pre-Acid Treatment Step Then, as a pre-stage prior to acid treatment for the oxo-titanylphthalocyanine compound produced in the above step or other steps, a pre-acid treatment step is preferably performed in which the oxo-titanylphthalocyanine compound is added in an aqueous organic solvent, the mixture is stirred under heating for a fixed time and then the solution is allowed to stand at a temperature lower than the stirring temperature for a fixed time, followed by being subjected to stabilizing treatment.

Examples of the aqueous organic solvent used in the pre-acid treatment include one type or two or more types of alcohols such as methanol, ethanol and isopropanol, N,N-dimethylformamide, N,N-dimethylacetamide, propionic acid, acetic acid, N-methylpyrrolidone and ethylene glycol. A nonaqueous organic solvent may be added to an aqueous organic solvent if its amount is small.

Though no particular limitation is imposed on the condition of the stirring treatment in the pre-acid treatment step, it is preferable to perform stirring treatment in the condition of a fixed temperature of about 70 to 200° C. for about 1 to 3 hours.

Moreover, though there is no particular limitation to the condition of the stabilizing treatment after the stirring treatment, the solution is preferably allowed to stand in the condition of a fixed temperature range of about 10 to 50° C. and particularly about 23±1° C. for 5 to 15 hours to stabilize. The pre-acid treatment is executed in this manner to obtain a crude oxo-titanylphthalocyanine crystal.

(2) Acid Treatment Step

Then, the acid treatment step is characterized in that the crude oxo-titanylphthalocyanine crystal is dissolved in an acid to obtain an oxo-titanylphthalocyanine solution.

This is because tire crude oxo-titanylphthalocyanine crystal is dissolved in an acid to enable to sufficiently decompose impurities derived from substances left unremoved when the oxo-titanylphthalocyanine compound is produced.

The acid to be used is preferably at least one type selected from the group consisting of concentrated sulfuric acid, trifluoroacetic acid and sulfonic acid.

This reason is that such an acid can decompose the above-described impurities more efficiently whereas it can efficiently suppress decomposition of the oxo-titanylphthalocyanine compound.

Also, the reason is that after such an acid treatment, components derived from these acids can be easily removed by washing as will be explained later.

The acid treatment step is preferably executed usually at 0 to 10° C. for 0.5 to 3.0 hours, though these conditions differ depending on the acid to be used.

(3) Dropwise Addition Step

Then, the oxo-titanylphthalocyanine solution obtained in the acid treatment step is added dropwise to a poor solvent to obtain a wet cake.

This is because washing effect in the subsequent washing step can be produced efficiently by adding the oxo-titanylphthalocyanine solution dropwise to a poor solvent.

Specifically, this is because the wet cake of the precipitated oxo-titanylphthalocyanine compound is put into an amorphous state having a large surface area by the dropwise addition, and therefore, the washing effect, in the subsequent washing step can be produced efficiently.

Also, the poor solvent to be used is preferably water.

This reason is that water can precipitate an oxo-titanylphthalocyanine compound mere easily from the viewpoint of polarity and temperature control.

Consequently, the surface area of the wet cake of the precipitated oxo-titanylphthalocyanine compound is increased to perform the washing step more efficiently.

Other usable poor solvents may include methanol, ethanol or a mixed solvent of methanol and water or a mixed solvent of ethanol and water.

Note that the temperature of the poor solvent is usually designed to be in a range from 0 to 20° C., though it differs depending on the type of the poor solvent to be used.

(4) Washing Step

Then, the wet cake of the oxo-titanylphthalocyanine compound obtained in the dropwise addition step is washed with an alcohol having 1 to 4 carbon atoms.

This is because washing the wet cake with an alcohol having 1 to 4 carbon atoms enables efficient improvement in the dispersibility of the oxo-titanylphthalocyanine crystal obtained in the subsequent crystal type transformation step in the photoreceptive layer. The effect of improving the dispersibility is considered to be obtained by reforming the surface properties of the oxo-titanylphthalocyanine crystal.

In any case, the washing with a predetermined alcohol makes it possible to stably obtain an oxo-titanylphthalocyanine crystal which is superior in dispersibility in a photoreceptive layer and contributes to improvements in sensitivity and charge retention rate of an electrophotographic photoreceptor when she oxo-titanylphthalocyanine crystal is added to the electrophotographic photoreceptor as a charge generating agent.

The alcohol having 1 to 4 carbon atoms is preferably at least one type selected from the group consisting of methanol, ethanol and 1-propanol.

This reason is that any of these alcohols can improve the dispersibility of the oxo-titanylphthalocyanine crystal in the photoreceptive layer more efficiently.

It is also preferable that the wet cake is washed with an alcohol having 1 to 4 carbon atoms, and then further washed with water.

This is because when the wet cake is further washed with water after washed with a predetermined alcohol, the crystal transition of the oxo-titanylphthalocyanine crystal can be suppressed to obtain a more stable oxo-titanylphthalocyanine crystal.

The washing operations with an alcohol having 1 to 4 carbon atoms and water are preferably repeated plural times, respectively.

To mention the washing method in more detail, for example, about 10 g of the wet cake may be dipped in about of 500 ml of a predetermined alcohol or water and suspended by stirring or the like to perform washing.

Also, the temperature of the predetermined alcohol or water used in the washing is designed to be preferably in a range from 0 to 50° C., and more preferably in a range from 10 to 40° C. The washing time is designed to be preferably in a range from 5 minutes to 10 hours, and more preferably in a range from 0.5 to 8 hours.

(5) Crystal Type Transformation Step

Then, the set cake obtained after the washing step is stirred under heating in an nonaqueous solvent to obtain an oxo-titanylphthalocyanine crystal.

This reason is that if the wet cake of the oxo-titanylphthalocyanine crystal is stirred under heating in a nonaqueous solvent, the crystal type can be transformed into a predetermined crystal type having the optical characteristics and thermal characteristics explained in the first embodiment.

In the above stirring under heating, the wet cake is preferably dispersed in the nonaqueous solvent in the presence of water and stirred at 30 to 70° C. for 5 to 40 hours.

Examples of the nonaqueous solvent include halogen type solvents such as chlorobenzene and dichloromethane.

(6) Inspection Step

The following inspection steps (e) to (g) are preferably involved after the aforementioned crystal type transformation step:

(e) a step of adding the oxo-titanylphthalocyanine crystal in an amount by weight of 1.25 parts based on 100 parts by weight of a mixed solvent of methanol and N,N-dimethylformamide (methanol:N,N-dimethylformamide=1:1 (by weight ratio)) to prepare a suspension;

(f) a step of filtering the suspension with a filter to obtain a filtrate; and (g) a step of confirming that the absorbance of the filtrate for light having a wavelength of 400 nm is a value in a range from 0.01 to 0.08.

This reason is that if the absorbance of a predetermined filtrate obtained through the above steps is measured, the dispersibility of the oxo-titanylphthalocyanine crystal in the photoreceptive layer can be evaluated easily and quantitatively, and it is therefore possible to produce more stably an oxo-titanylphthalocyanine crystal which is stable and is superior in dispersibility in the photoreceptive layer.

Specifically, this is because when the absorbance of the filtrate for light having a wavelength of 400 nm is less than 0.01, a problem as to the formation of an oxo-titanylphthalocyanine crystal itself may arise, whereas when, the absorbance of the filtrate for light having a wavelength of 400 nm exceeds 0.08, the dispersibility of the oxo-titanylphthalocyanine crystal may tend to decrease, which is a cause of a reduction in sensitivity and charge retention rate in an electrophotographic photoreceptor.

Therefore, the absorbance of the filtrate for light having a wavelength of 400 nm is more preferably a value in a range from 0.012 to 0.07, and still more preferably a value in a range from 0.012 to 0.05.

The reason why the absorbance for light having a wavelength of 400 nm is measured as an index of dispersibility is that a correlation among the absorbance for the light having such a wavelength, the dispersibility of the oxo-titanylphthalocyanine crystal and the electric characteristics of the electrophotographic photoreceptor caused by the dispersibility has been empirically found.

Also, such a correlation is considered to be created because the condition of reformation of surface characteristics of the oxo-titanylphthalocyanine crystal is reflected on the absorbance for the light having a wavelength of 400 nm.

A method for measuring the absorbance of a predetermined filtrate will be explained in Examples explained later.

As to the condition under which the suspension is obtained in the step (e), a suspension obtained by stirring in the stirring condition of a temperature of 23±3° C. and a rotational speed of 100 rpm for 1 hour is used.

As to the amount of the mixed solvent used to suspend the oxo-titanylphthalocyanine crystal methanol and N-dimethylamide are mixed in a total amount of 8 g (4 g each).

The amount of the oxo-titanylphthalocyanine crystal to be suspended is designed to be 0.1 g.

Also, as the filter used to filter the suspension in the step (f), a 0.1-μm filter which is a PTFE type is used.

Moreover, the absorbing layer (filtrate) when the absorbance is measured in the step (g) is designed to have a thickness of 10 mm (cell length).

Then, 1.25 parts by weight of a predetermined oxo-titanylphthalocyanine crystal is added to 100 parts by weight of a mixed solvent of methanol and N,N-dimethylformamide (methanol:N,N-dimethylformamide=1:1 (by weight ratio)) to prepare a suspension, and then, the suspension is filtered with a filter to obtain a filtrate. With reference to FIG. 1, description will be given to the relation between the absorbance of the filtrate for light having a wavelength of 400 nm and the sensitivity of an electrophotographic photoreceptor containing the oxo-titanylphthalocyanine crystal as a charge generating agent.

Specifically, FIG. 1 shows a characteristic curve, in which the abscissa is the absorbance (-) of the above predetermined filtrate for light having a wavelength of 400 nm while the ordinate is the absolute value (V) of the sensitivity of the electrophotographic photoreceptor. For example, the configuration of the electrophotographic photoreceptor and a method for measuring the sensitivity will be described in Examples.

As is understood from the characteristic curve, the absolute value (V) of the sensitivity increases with an increase in the value of the absorbance (-) of the predetermined filtrate. Note that a smaller absolute value (V) of the sensitivity means that the electrophotographic photoreceptor has more excellent sensitivity characteristics.

To explain more specifically, it is understood that as the value of the absorbance (-) of the predetermined filtrate increases 0 to 0.08, the absolute value (V) of the sensitivity sharply increases from about 40 V while the absolute value takes on a value of about 60 V or less.

It is also understood that when the value of the absorbance (-) of the predetermined filtrate exceeds 0.08 on the other hand, the absolute value (V) of the sensitivity takes on a value as higher as about 60 V or more, though an increase in the absolute value (V) of the sensitivity is moderate.

Therefore, it is understood that in order to limit the absolute value (V) of the sensitivity to about 60 V or less to obtain excellent sensitivity characteristics, it is effective to set the value of the absorbance (-) of the predetermined filtrate to a value of 0.08 or less.

Figure 2:
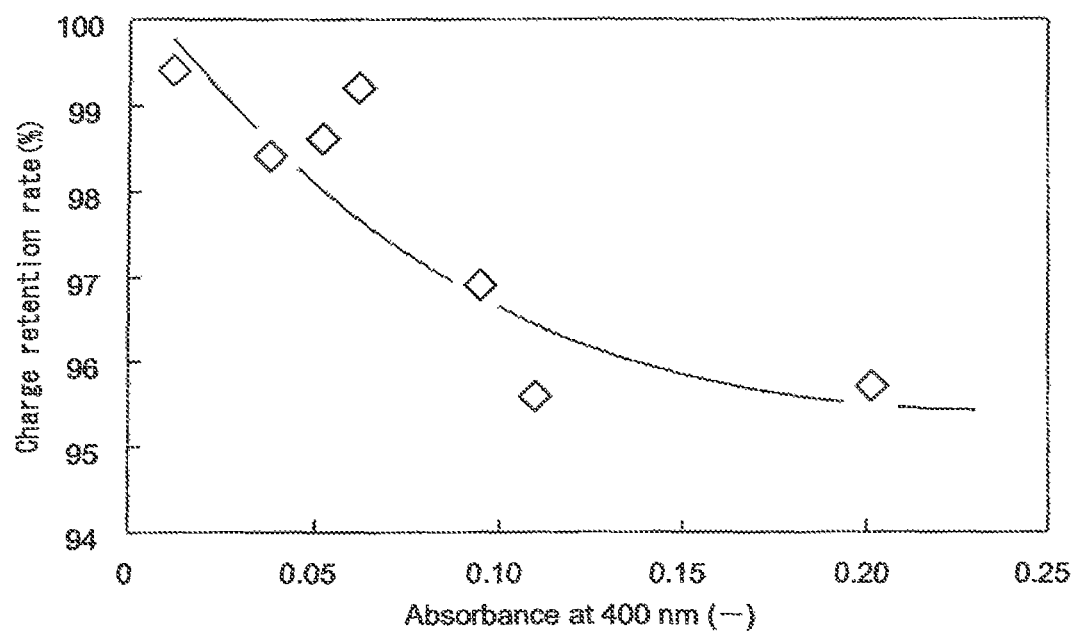
FIG. 2 is a graph for explaining the relationship between the absorbance and the charge retention rate.

1.25 parts by weight of a predetermined oxo-titanylphthalocyanine crystal is added to 100 parts by weight of a mixed solvent of methanol and N,N-dimethylformamide (methanol:N,N-dimethylformamide=1:1 (by weight ratio)) to prepare a suspension and then, the suspension is filtered with a filter to obtain a filtrate. With reference to FIG. 2, description will be given to the relation between the absorbance of the filtrate for light having a wavelength of 400 nm and the charge retention rate (%) of an electrophotographic photoreceptor containing the oxo-titanylphthalocyanine crystal as a charge generating agent.

Specifically, FIG. 2 shows a characteristic curve, in which the abscissa is the absorbance (-) of the above predetermined filtrate for light having a wavelength of 400 nm while the ordinate is the charge retention rate (%) of the electrophotographic photoreceptor. For example, the configuration of the electrophotographic photoreceptor and a method for measuring the charge retention rate will be described in Examples.

As is understood from the characteristic curve, the value of the charge retention race (%) decreases with an increase in the value of the absorbance (-) of the predetermined filtrate. Note that a larger charge retention rate (%) means that an electrostatic latent image formed on the surface of the electrophotographic photoreceptor can be retained for a longer time and the electrophotographic photoreceptor is superior in electric characteristics.

To explain more specifically, it is understood that as the value of the absorbance (-) of the predetermined filtrate increases 0 to 0.08, the value of the charge retention rate (%) slightly sharply decreases from about 100% while the charge retention rate (%) takes on a value of about 97.5% or more.

It is also understood that when the value of tire absorbance (-) of she predetermined filtrate exceeds 0.08 on the other hand, the charge retention rate (%) takes on a value as low as about 97.5% or less, though a reduction in the value of the charge retention rate (%) is moderate.

Therefore, it is understood that in order to keep the value of the charge retention rate (%) at a level of about 97.5% or more to obtain superior electric characteristics, it is effective to set the value of the absorbance (-) of the predetermined filtrate to a value of 0.08 or less.

Next, the relationship between the dispersibility of the oxo-titanylphthalocyanine crystal in the photoreceptive layer and the sensitivity of the electrophotographic photoreceptor will be explained with reference to FIG. 3.

Here, as the index of dispersibility, a parameter $(A \cdot C^{-1} \cdot d^{-1})$ (unit: 1/(wt %·m), the same as follows) is used which is constituted of the reflection absorbance (A/-) for light having a wavelength of 700 nm in the photoreceptive layer containing the oxo-titanylphthalocyanine crystal, the film thickness (d/m) of the photoreceptive layer and the concentration (C/wt %) of the oxo-titanylphthalocyanine crystal in the photoreceptive layer. The parameter and a method for measuring the reflection absorbance of the photoreceptive layer will be explained later. Fundamentally, the parameter is used for the evaluation of she dispersibility of the oxo-titanylphthalocyanine crystal in the photoreceptive layer according to the Lambert-Beer's law.

Figure 3:
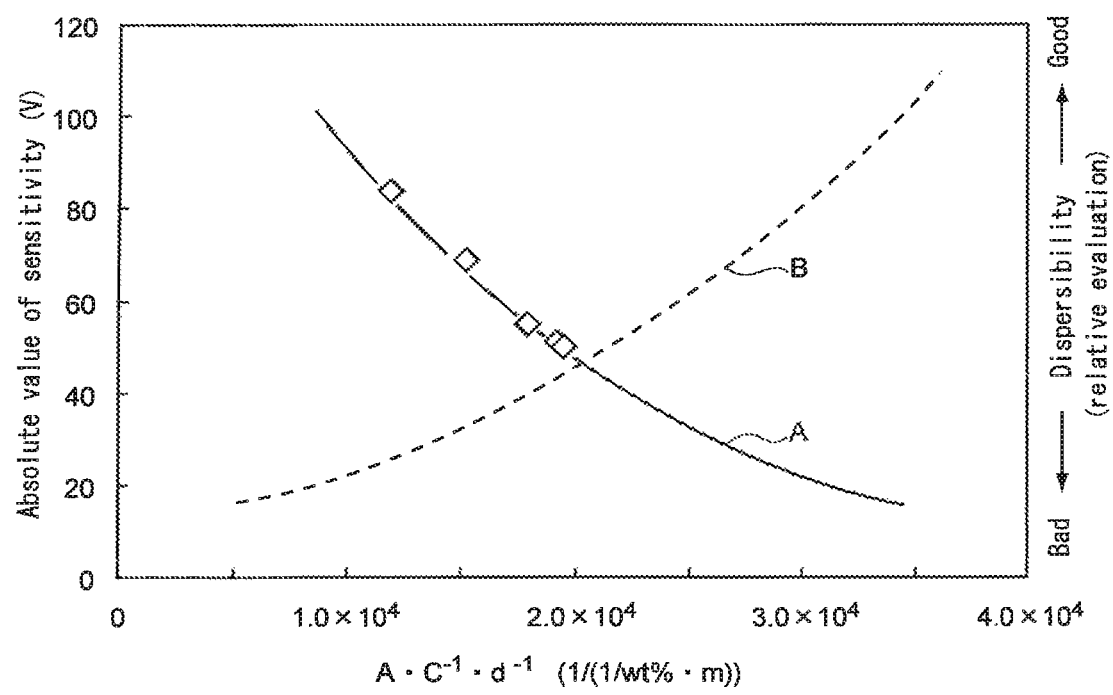
FIG. 3 is a graph for explaining the relationship between the dispersibility and the sensitivity.

Specifically, in FIG. 3, the abscissa is the value of $(A \cdot C^{-1} \cdot d^{-1})$, the left ordinate is the absolute value (V) of the sensitivity of the electrophotographic photoreceptor in relation to a characteristic curve A and the right ordinate is the dispersibility (relative evaluation) of the oxo-titanylphthalocyanine crystal in the photoreceptive layer in relation to a characteristic curve B.

Also, the relative evaluation of the dispersibility of the oxo-titanylphthalocyanine crystal in the photoreceptive layer is based on the results of observation using a microscope.

As is understood from the characteristic curve B, the dispersibility (relative, evaluation) of the oxo-titanylphthalocyanine crystal is more improved with an increase in the value of $(A \cdot C^{-1} \cdot d^{-1})$.

In other words, a larger value of $(A \cdot C^{-1} \cdot d^{-1})$ shows that the dispersibility of the oxo-titanylphthalocyanine crystal in the photoreceptive layer is higher.

Thus, it can be said that the dispersibility of the oxo-titanylphthalocyanine crystal can be clearly evaluated by the value of $(A \cdot C^{-1} \cdot d^{-1})$.

As is understood from the characteristic curve A, the absolute value of the sensitivity is reduced with an increase in the value of $(A \cdot C^{-1} \cdot d^{-1})$.

Therefore, when the results of the characteristic curves A and B are evaluated overall, it can be said that the sensitivity of the electrophotographic photoreceptor is more improved with an increase in the dispersibility of the oxo-titanylphthalocyanine crystal.

As a consequence, it can be said that the sensitivity of the electrophotographic photoreceptor is improved more efficiently by using the oxo-titanylphthalocyanine crystal superior in dispersibility according to the present invention.

It has been separately confirmed that the charge retention rate of the photographic photoreceptor is also clearly related with the dispersibility of the oxo-titanylphthalocyanine crystal similarly to the case of the sensitivity.

Note that when the electrophotographic photoreceptor is a laminate type, the dispersibility of the oxo-titanylphthalocyanine crystal may be evaluated by using its charge generating layer as the subject.

Third Embodiment

A third embodiment of the present invention relates to an electrophotographic photoreceptor including a substrate and a photoreceptive layer containing a charge generating agent, a charge transfer agent and a binding resin, the photoreceptive layer being formed on the substrate, wherein the charge generating agent is an oxo-titanylphthalocyanine crystal having a maximum diffraction peak at a Bragg angle $(2\theta \pm 0.2°)=27.2°$ in a CuKα characteristic X-ray diffraction spectrum and one peak in a temperature range from 270 to 400° C. other than the peak derived from vaporization of adsorbed water in differential scanning calorimetric analysis, the oxo-titanylphthalocyanine crystal being produced by a production method including the following steps (a) to (d):

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

The contents which have been already explained in the first and second embodiments are appropriately omitted, and the electrophotographic photoreceptor of the third embodiment will be explained by primarily taking a monolayer type photographic photoreceptor as an example.

1. Basic Configuration

As shown in FIG. 4A, the basic configuration of an electrophotographic photoreceptor 10 according to the invention preferably includes a substrate 12 and a single photoreceptive layer 14 formed on the substrate 12, the photoreceptive layer containing a specific charge generating agent, a charge transfer agent and a binding resin.

This reason is that the monolayer type electrophotographic photoreceptor 10 can be applied to both positive and negative charge types and also enables a simple layer structure, which makes it possible to suppress coating film defects and to improve productivity when the photoreceptive layer is formed.

This reason is also that optical characteristics can be improved because the number of interfaces between layers is small.

As is illustrated in FIG. 4B, a monolayer type photoreceptor 10' having an intermediate layer 16 formed between the photoreceptive layer 14 and the substrate 12 may be adopted.

2. Substrate

Figure 4:
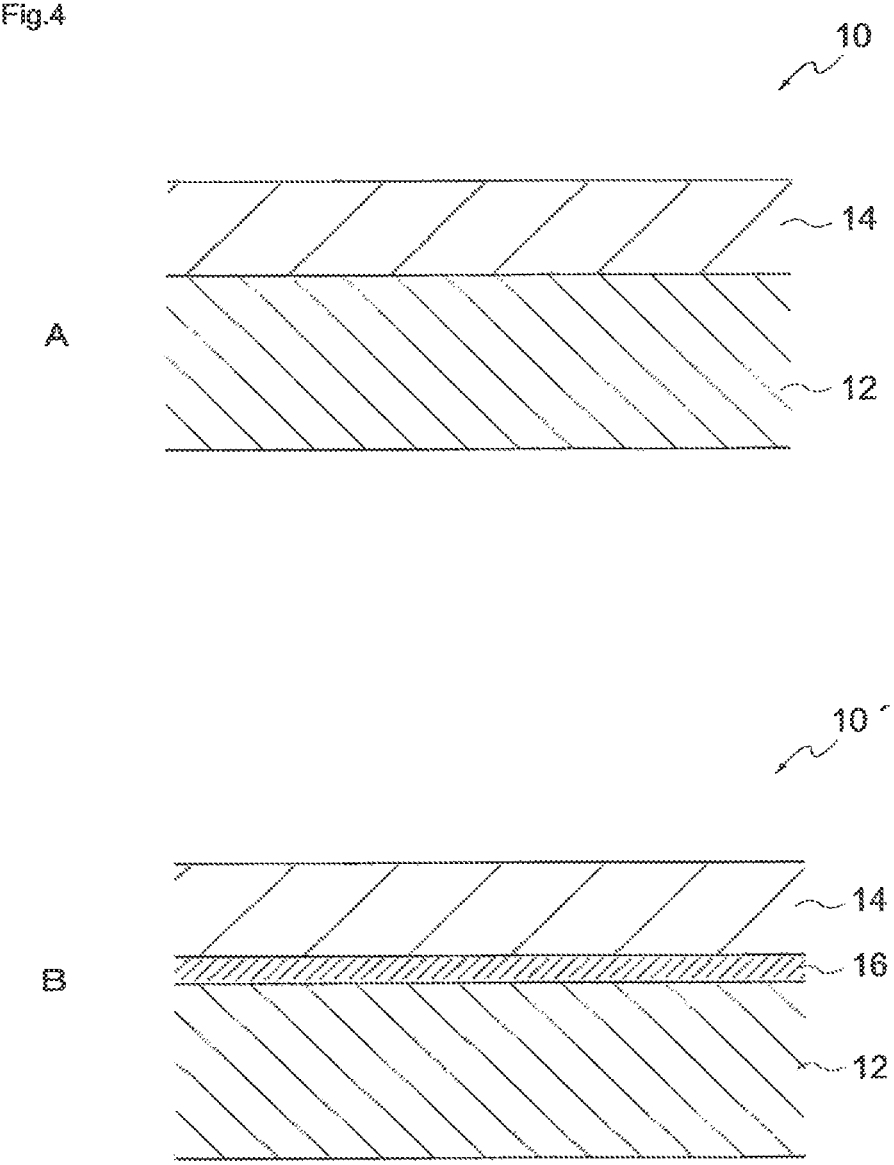
FIGS. 4A and 4B are views for explaining the configuration of a monolayer type electrophotographic photoreceptor according to the present invention.

Various materials having conductivity may be used as the substrate 12 illustrated in FIG. 4. Examples of these materials include metals such as iron, aluminum, copper, tin, platinum, silver, vanadium, molybdenum, chromium, cadmium, titanium, nickel, palladium, indium, stainless steel and brass; plastic materials coated with the above metal by deposition or lamination; and glasses coated with, for example, alumite, aluminum iodide, tin oxide or indium oxide.

The shape of the substrate may be any form including a sheet-form and drum-form in accordance with the structure of an image forming apparatus to be used. It is only required for the substrate itself or its surface to have conductivity. In addition, the substrate is preferably one having sufficient mechanical strength upon use. In the case of a drum-form, the diameter of the substrate is designed to be in a range from 10 to 60 mm, and more preferably from 10 to 35 mm in view of developing a small-sized device.

In order to prevent the generation of interference fringes, the surface of the support substrate may be subjected to surface roughing treatment using a method such as etching, anodic oxidation, wet blasting method, sand blasting method, rough abrasion and centerless cutting.

When the substrate is subjected to, for example, anodic oxidation, the substrate may have nonconductive or semiconductive characteristics. Even in such a case, it may be used as the substrate insofar as it produces predetermined effects.

3. Intermediate Layer

As shown in FIG. 4B, an intermediate layer 16 containing a predetermined binding resin may be formed on the substrate 12.

This is because the intermediate layer improves the adhesion between the substrate and the photoreceptive layer and also, the addition of the predetermined binding resin micropowder to the intermediate layer ensures that incident light is scattered to thereby suppress not only the generation of interference fringes but also the injection of charges into the photoreceptive layer during unexposed time, that is the cause of fogging and black spots. Any material may be used as the micropowder without any particular limitation insofar as it has light-scattering ability and dispersibility. Examples of the micropowder include white pigments such as titanium oxide, zinc oxide, zinc flower, zinc sulfide, zinc white and lithopone; inorganic pigments as extenders such as alumina, calcium carbonate and barium sulfate; fluororesin particles; benzoguanamine resin particles; and styrene resin particles.

The film thickness of the intermediate layer is preferably at value in a range from 0.1 to 50 μm. This is because if the intermediate layer is too thick, residual potential may tend to arise on the surface of the photoreceptor, which is a cause of deteriorated electric characteristics, whereas if the intermediate layer is too thin, the surface irregularities of the substrate can be insufficiently flattened, thereby failing to obtain the adhesion between the substrate and the photoreceptive layer.

For this reason, the thickness of the intermediate layer is preferably a value in a range from 0.1 to 50 μm, and more preferably a value in a range from 0.5 to 30 μm.

4. Photoreceptive Layer

(1) Binding Resin

No particular limitation is imposed on the type of the binding resin to be used in the photographic photoreceptor of the invention. Usable examples of the binding resin include, in addition to a polycarbonate resin, thermoplastic resins such as a polyester resin, polyarylate resin, styrene-butadiene copolymer, styrene-acrylonitrile copolymer, styrene-maleic acid copolymer, acryl copolymer, styrene-acrylic acid copolymer, polyethylene, ethylene-vinyl acetate copolymer, polyethylene chloride, polyvinyl chloride, polypropylene, ionomer, vinyl chloride-vinyl acetate copolymer, alkyd resin, polyamide, polyurethane, polysulfone, diallyl phthalate resin, ketone resin, polyvinylbutyral resin and polyether resin; crosslinking thermosetting resins such as a silicone resin, epoxy resin, phenol resin, urea resin and melamine resin; and photocurable resins such as epoxyacrylate and urethaneacrylate.

(2) Charge Generating Agent

The charge generating agent to be used in the invention is an oxo-titanylphthalocyanine crystal having a maximum diffraction peak at a Bragg angle $(2\theta\pm0.2°)=27.2°$ in a CuKα characteristic X-ray diffraction spectrum and one peak in a temperature range from 270 to 400° C. other than the peak derived from vaporization of adsorbed eater in differential scanning calorimetric analysis, the oxo-titanylphthalocyanine crystal being obtained by a production method including the following steps (a) to (d):

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) A step of stirring the washed wet cake under heating in a nonaqueous solvent to obtain an oxo-titanylphthalocyanine.

This is because such an oxo-titanylphthalocyanine crystal has crystal stability and is also superior in dispersibility in the photoreceptive layer, which enables to obtain an electrophotographic photoreceptor having excellent sensitivity and charge retention rate.

The details of the oxo-titanylphthalocyanine crystal as the charge generating agent are overlapped on the descriptions in the first and second embodiments, and are therefore omitted.

The addition quantity of the oxo-titanylphthalocyanine crystal as the charge generating agent is preferably designed to be in a range from 0.1 to 50 parts by weight based on 100 parts by weight of the binding resin which will be explained later.

This reason is that if the addition quantity of the charge generating agent is made to be in the above range, the charge generating agent can generate charges efficiently when the electrophotographic photoreceptor is exposed to light. In other words, the reason is that if the addition quantity of the charge generating agent is less than 0.1 part by weight based on 100 parts by weight of the binding resin, the amount of the charge generating agent may be not enough to form an electrostatic latent image on the photoreceptor, whereas if the addition quantity of the charge generating agent exceeds 50 parts by weight based on 100 parts by weight of the binding resin, it may be difficult to disperse the charge generating agent uniformly in the photoreceptive layer application liquid.

For this reason, the addition quantity of the charge generating agent is more preferably a value in a range from 0.5 to 30 parts by weight based on 100 parts by weight of the binding resin.

(3) Hole Transfer Agent

Also, no particular limitation is imposed on the hole transfer agent to be used in the invention, and conventionally known various hole transfer compounds may be all used. Preferably usable hole transfer compounds include a benzidine type compound, a phenylenediamine type compound, a naphthylenediamine type compound, a phenanethrylenediamine type compound, an oxadiazole type compound (for example, 2,5-di(4-methylaminophenyl)-1,3,4-oxadiazole), a styryl type compound (for example, 9-(4-diethylaminostyryl) anthracene), a carbazole type compound (for example, poly-N-vinylcarbazole), an organic polysilane compound, a pyrazoline type compound (for example, 1-phenyl-3-(p-dimethylaminophenyl)pyrazoline), a hydrazone type compound, a triphenylamine type compound, an indole type compound, an oxazole type compound, an isooxazole type compound, a thiazole type compound, a thiadiazole type compound, an imidazole type compound, a pyrazole type compound, a triazole type compound, a butadiene type compound, a pyrene-hydrazone type compound, an acrolein type compound, a carbazole-hydrazone type compound, a quinoline-hydrazone type compound a stilbene type compound, a stilbene-hydrazone type compound and a diphenylenediamine type compound. These compounds are used independently or may be used in combinations of two or more.

Also, the addition quantity of the hole transfer agent is preferably designed to be in a range from 1 to 120 parts by weight of 100 parts by weight of the binding resin.

This is because if the addition quantity of the hole transfer agent is less than 1 part by weight, the hole transfer ability of the photoreceptive layer may be remarkably deteriorated to thereby give an adverse influence on image characteristics, whereas if the addition quantity of the hole transfer agent exceeds 120 parts by weight, this gives rise to the problem that the dispersibility of the hole transfer agent is deteriorated and the hole transfer agent is easily crystallized.

Therefore, the addition quantity of the hole transfer agent is more preferably a value in a range from 5 to 100 parts by weight, and still more preferably a value in a range from 10 to 90 parts by weight based on 100 parts by weight of the binding resin.

(4) Electron Transfer Agent

No particular limitation is imposed on the electron transfer agent to be used in the invention. Preferably usable electron transfer agents include a benzoquinone type compound, a naphthoquinone type compound, an anthraquinone type compound, a diphenoquinone type compound, a dinaphthoquinone type compound, a naphthalenetetracarboxylic acid diimide type compound, a fluorenone type compound, a malononitrile type compound, a thiopyran type compound, a trinitrothioxanthone type compound, a dinitroanthracene type compound, a dinitroacridine type compound, a nitroanthraquinone type compound, and a dinitroanthraquinone type compound. These compounds are used independently or may be used in combinations of two or more.

The addition quantity of the electron transfer agent is preferably designed to be 1 to 120 parts by weight based on 100 parts by weight of the binding resin.

This is because if the addition quantity of the electron transfer agent is less than 1 part by weight, the electron transfer ability of the photoreceptive layer is remarkably deteriorated to thereby give an adverse influence on image characteristics, whereas if the addition quantity of the electron transfer exceeds 120 parts by weight, this gives rise to the problem that the dispersibility of the electron transfer agent is deteriorated and the electron transfer agent is easily crystallized.

Therefore, the addition quantity of the electron transfer agent is more preferably a value in a range from 5 to 100 parts by weight, and still more preferably a value in a range from 10 to 90 parts by weight based on 100 parts by weight of the binding resin.

(5) Thickness

The film thickness of the photoreceptive layer is preferably designed to be in a range from 5.0 to 100 μm.

This reason is that if the thickness of the photoreceptive layer is less than 5.0 μm, the mechanical strength required for the electrophotographic photoreceptor may be insufficient, whereas if the thickness of the photoreceptive layer exceeds 100 μm, the photoreceptive layer may tend to peel from the substrate and it may be difficult to form the photoreceptive layer uniformly. For this reason, the thickness of the photoreceptive layer is more preferably a value in a range from 10 to 50 μm, and still more preferably a value in a range from 20 to 40 μm.

(6) Relational Expression (1)

Also, the following relational expression (1) is preferably established between the reflection absorbance (A/-) of the photoreceptive layer for light having a wavelength of 700 nm, the film thickness (d/m) of the photoreceptive layer and the concentration (C/wt %) of the oxo-titanylphthalocyanine crystal in the photoreceptive layer.

$$A \cdot C^{-1} \cdot d^{-1} > 1.75 \times 10^{-4} \tag{1}$$

This reason is that in the case of a photoreceptive layer satisfying the relational expression (1), the dispersibility of the oxo-titanylphthalocyanine crystal in the photoreceptive layer is easily confirmed.

Specific reason is as follows: as explained with reference to FIG. 3 in the second embodiment, there is a clear correlation between the value of $(A \cdot C^{-1} \cdot d^{-1})$ $(1/(wt \% \cdot m))$ which is the left side of the relational expression (1) and the dispersibility of the oxo-titanylphthalocyanine crystal in the photoreceptive layer. Therefore, the dispersibility of the oxo-titanylphthalocyanine crystal in the photoreceptive layer and the electric characteristics of the electrophotographic photoreceptor which are dependent on the dispersibility can be easily confirmed by observing whether the value $(A \cdot C^{-1} \cdot d^{-1})$ is in the predetermined range or not.

Here, the left side $(A \cdot C^{-1} \cdot d^{-1})$ of the relational expression (1) is regarded as a parameter expressing the dispersibility of the oxo-titanylphthalocyanine crystal in the photoreceptive layer according to the Lambert-Beer's law.

Specifically, this reason is that when the film thickness (d/m) of the photoreceptive layer and the concentration (C/wt %) of the oxo-titanylphthalocyanine crystal in the photoreceptive layer are fixed, incident light is scarcely absorbed and reflection absorbance (A) for light having a wavelength of 700 nm tends to be small if the dispersibility of the oxo-titanylphthalocyanine crystal in the photoreceptive layer is insufficient, whereas if the dispersibility of the oxo-titanylphthalocyanine crystal is insufficient, incident light is easily absorbed and reflection absorbance (A) of the photoreceptive layer for light having a wavelength of 700 nm is large.

Therefore, it is understood from this reason that the dispersibility of the oxo-titanylphthalocyanine crystal in the photoreceptive layer can be evaluated from the value of the left side $(A \cdot C^{-1} \cdot d^{-1})$ of the relational expression (1).

When, the electrophotographic photoreceptor is a laminate type, its charge generating layer is used as the subject to evaluate the dispersibility of the oxo-titanylphthalocyanine crystal.

With reference to FIG. 3, description will be given to the relation between the value of $A \cdot C^{-1} \cdot d^{-1}$ (unit; $1/(wt \% \cdot m)$, the same as follows) which is the let side of the relational expression (1)) and the sensitivity of the electrophotographic photoreceptor.

Specifically, in FIG. 3, the abscissa is the value of $(A \cdot C^{-1} \cdot d^{-1})$ and the ordinate (left axis) is the absolute value (V) of the sensitivity to show a characteristic curve A.

As is understood from the characteristic curve A, as the value of $(A \cdot C^{-1} \cdot d^{-1})$ is closer to 0, the absolute value (V) of the sensitivity is larger, whereas as the value of $(A \cdot C^{-1} \cdot d^{-1})$ is larger, the absolute value (V) of the sensitivity is smaller. To mention in more detail, it is understood that as the value of $(A \cdot C^{-1} \cdot d^{-1})$ is increased, the absolute value (V) of the sensitivity sharply drops when the value of $(A \cdot C^{-1} \cdot d^{-1})$ is in a range from 0 to $1.75 \times 10^4$. It is also understood that as the value of $(A \cdot C^{-1} \cdot d^{-1})$ is increased, the absolute value (V) of the sensitivity gradually drops and takes a value of 60 V or less when the value of $(A \cdot C^{-1} \cdot d^{-1})$ is in a range above $1.75 \times 10^4$.

The value of $(A \cdot C^{-1} \cdot d^{-1})$ is designed to be more preferably $1.9 \times 10^4$ or more and still more preferably $2.0 \times 10^4$ or more.

The reflection absorbance (A/-) of the photoreceptive layer for light having a wavelength of 700 nm may be measured, for example, in the following manner.

First, the reflection absorbance ($A_1$) of a support substrate on which a photoreceptive layer (standard thickness: $2.5 \times 10^{-5}$ m) is laminated, for light having a wavelength of 700 nm is measured by a color difference meter (trade name: Color Difference Meter CM1000, manufactured by Minolta Camera Co., Ltd.). Next, the reflection absorbance ($A_2$) of a support substrate on which no photoreceptive layer is laminated, for light having a wavelength of 700 nm is measured in the same manner as above.

Figure 5:
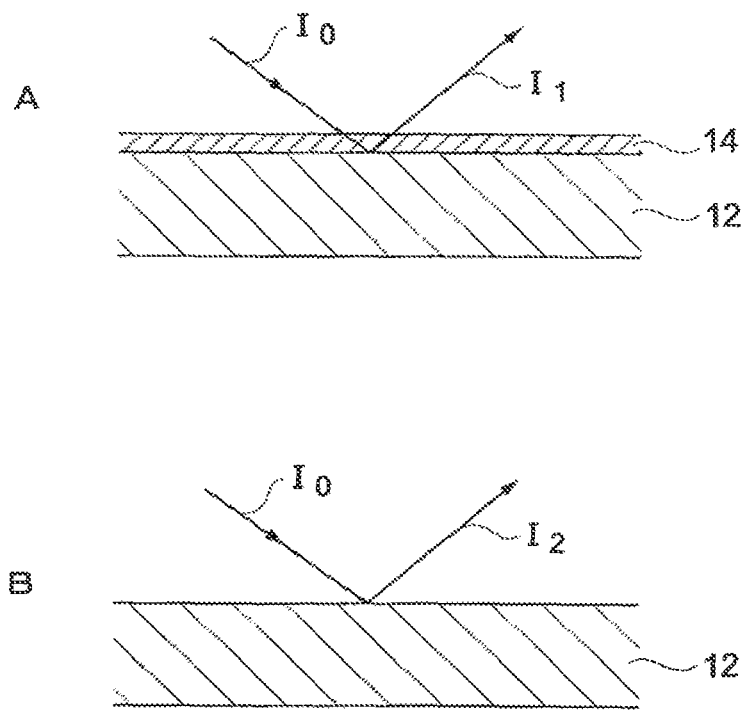
FIGS. 5A and 5B are views for explaining a method for measuring the reflection absorbance of a photoreceptive layer.
Figure 7:
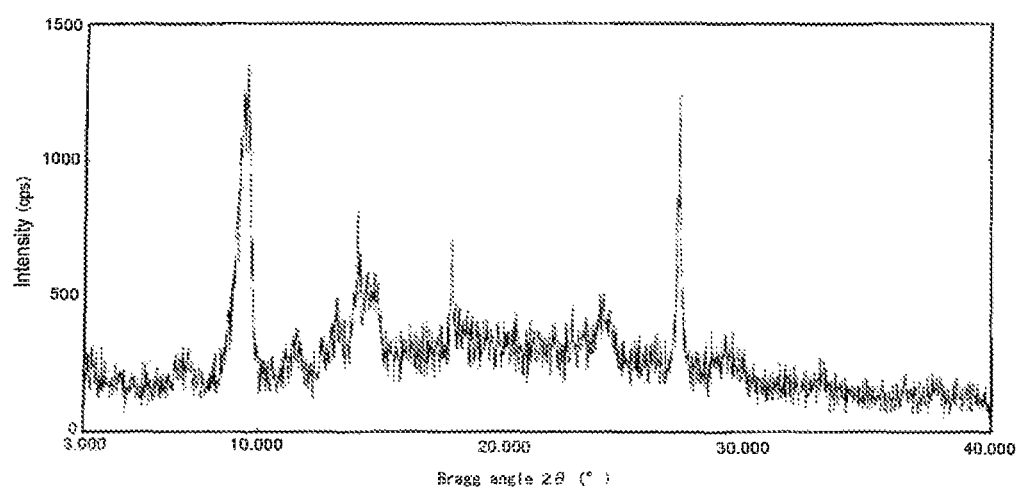
FIG. 7 is a CuKα characteristic X-ray diffraction spectrum of an oxo-titanylphthalocyanine crystal used in examples.

More detailed explanations will be furnished with reference to FIGS. 5A and 5B, in which FIG. 5A shows the condition of the support substrate 12 on which the photoreceptive layer 14 is laminated and FIG. 5B shows the condition of only the support substrate 12 on which no photoreceptive layer 14 is laminated. $I_0$ in FIGS. 5A and 5B denotes the intensity of light (incident light) applied to each support substrate, and $I_1$ and $I_2$ denote the intensities of the reflections of the lights incident to the respective support substrates. In order to eliminate the influence of the support substrate to obtain the reflection absorbance of the photoreceptive layer, it is only necessary to subtract the reflection absorbance $A_2$ of the support substrate from the reflection absorbance $A_1$ in which the reflection absorbances of the photoreceptive layer and support substrate are intermingled.

Then, the reflection absorbance (A) of an intermediate layer may be calculated from the following numerical formula (1) based on the values ($A_1$, $A_2$) of the obtained reflection absorbances.

The reflection absorbance ($A_1$) in FIG. 5A is calculated from the following numerical formula (2), and, similarly, the reflection absorbance ($A_2$) FIG. 5B is calculated from the following numerical formula (3).

$$A = A_1 - A_2 \quad (1)$$

$$A_1 = -\log I_1/I_0 \quad (2)$$

$$A_2 = -\log I_2/I_0 \quad (3)$$

5. Production Method

Though no particular limitation is imposed on the method for producing a monolayer type photographic photoreceptor, the method may be performed according to the following procedures.

First, a specific charge generating agent, charge transfer agent, binding resin and other additives are added in a solvent to prepare an application liquid. The obtained application liquid is applied to a conductive substrate (aluminum preliminary pipe) by, for example, a dip coat method, a spray coating method, a beads coating method, a blade coating method and a roller coating method.

Thereafter, the coating layer is dried by hot air at 100° C. for 30 minutes to obtain a monolayer type photographic photoreceptor that includes a photoreceptive layer having a fixed film thickness.

Various organic solvents may be used as the solvent used to prepare the dispersion solution. Examples of the solvent include alcohols such as methanol, ethanol, isopropanol and butanol; aliphatic hydrocarbons such as n-hexane, octane and cyclohexane; aromatic hydrocarbons such as benzene, toluene and xylene; halogenated hydrocarbons such as dichloromethane, dichloroethane, chloroform, carbon tetrachloride and chlorobenzene; ethers such as dimethyl ether, diethyl ether, tetrahydrofuran, ethylene glycol dimethyl ether, diethylene glycol dimethyl ether, 1,3-dioxolan and 1,4-dioxane; ketones such as acetone, methyl ethyl ketone and cyclohexanone; esters such as ethyl acetate and methyl acetate; dimethylformaldehyde, dimethylformamide and dimethylsulfoxide. These solvents may be used either singly or in combinations of two or more. At this time, a surfactant, a leveling agent and the like may be compounded in order to improve the dispersibility of the charge generating agent and the smoothness of the surface of the photoreceptive layer.

Also, it is preferable to form an intermediate layer on the substrate before the photoreceptive layer is formed.

In the formation of this intermediate layer, the binding resin and, according to the need, additives (organic micropowder or inorganic micropowder) are mixed and dispersed using a known method using a roll mill, a ball mill, an attritor, a paint shaker, an ultrasonic dispersing machine or the like to prepare an application liquid. The application liquid is applied to the substrate by known measures, for example, a blade method, a dipping method or a spraying method, followed by heat treatment to form an intermediate layer.

A small amount of various additives (organic micropowder or inorganic micropowder) may be added within a range free of problems concerning precipitation in the production process, with the intention of, for example, scattering light to thereby prevent the generation of interference fringes.

Next, the obtained application liquid may be applied to, for example, the surface of a support substrate (aluminum preliminary pipe) by a coating method such as a dip coat method, a spray coating method, a beads coating method, a blade coating method and a roller coating method.

The subsequent step of drying the application liquid on the substrate is performed at a temperature from 20 to 200° C. for 5 minutes to 2 hours.

Various organic solvents may be used as a solvent used to prepare the application liquid. Examples of the solvent include alcohols such as methanol, ethanol, isopropanol and butanol; aliphatic hydrocarbons such as n-hexane, octane and cyclohexane; aromatic hydrocarbons such as benzene, toluene and xylene; halogenated hydrocarbons such as dichloromethane, dichloroethane, chloroform, carbon tetrachloride and chlorobenzene; ketones such as acetone, methyl ethyl ketone and cyclohexanone; esters such as ethyl acetate and methyl acetate; dimethylformaldehyde, dimethylformamide and dimethylsulfoxide. These solvents may be used either singly or in combinations of two or more.

6. Laminate Type Electrophotographic Photoreceptor

When constituting the electrophotographic photoreceptor of the present invention, as shown in FIG. 6, the photoreceptive layer is also preferably a laminate type photoreceptive layer 20 including a charge generating layer 24 containing a specific charge generating agent and a charge transfer layer 22 containing a charge transfer agent and a binding resin.

The laminate type electrophotographic photoreceptor 20 may be manufactured by forming a charge generating layer 24 containing a specific charge generating agent on a substrate 12 by means of vapor deposition or coating, and then applying an application liquid containing a charge transfer agent and a binding resin on the charge generating layer 24, followed by drying the application liquid to form a charge transfer layer 22.

Contrary to the above structure, the charge transfer layer 22 is formed on the substrate 12 and the charge generating layer 24 may be formed on the charge transfer layer 22 as shown in FIG. 6B. Because the charge generating layer 24 has a very lower thickness than the charge transfer layer 22, it is preferable to form the charge transfer layer 22 on the charge generating layer 24 to protect the charge generating layer 24 as shown in FIG. 6A.

Also, an intermediate layer 25 is preferably formed on the substrate in the same manner as in the case of the monolayer type photoreceptor.

Also, the charge generating layer forming application liquid and the charge transfer layer forming application liquid may be prepared, for example, by dispersing/mixing predetermined components such as a specific charge generating agent, a charge transfer agent and a binding resin together with a dispersion medium by using a roll mill, a ball mill, an attritor, a paint shaker, an ultrasonic dispersing machine or the like.

Though no particular limitation is imposed on the thickness of the photoreceptive layer (charge generating layer and charge transfer layer) in the laminate type photoreceptive layer 20, the thickness of the charge generating layer is preferably 0.01 to 5 μm and more preferably 0.1 to 3 μm and the thickness of the charge transfer layer is preferably 2 to 100 μm and more preferably 5 to 50 μm.

EXAMPLES

The present invention will be explained in detail by way of Examples.

Example 1

1. Production of Oxo-Titanylphthalocyanine Compound

A flask in which the atmosphere was substituted with argon was charged with 22 g (0.17 mol) of o-phthalonitrile, 25 g (0.073 mol) of titanium tetrabutoxide, 300 g of quinoline and 2.28 g (0.038 mol) of urea, and the mixture was heated to 150° C. with stirring.

Then, the reaction system was heated to 215° C. while removing the vapor generated from the reaction system out of the system and then the reaction was further continued for 2 hours with stirring while keeping this temperature.

Then, after the reaction was finished, the reaction mixture was cooled. When the mixture was cooled to 150° C., the reaction mixture was take out of the flask and subjected to filtration using a glass filter. The obtained solid was washed with N,N-dimethylformamide and methanol in this order, followed by vacuum drying to obtain 24 g of a bluish violet solid.

2. Production of Oxo-Titanylphthalocyanine Crystal (1) Pretreatment Prior to Pigmentation Treatment 12 g of the bluish violet solid obtained in the above production of the oxo-titanylphthalocyanine compound was added in 100 ml of N,N-dimethylformamide, and the mixture was heated to 130° C. for 2 hours to perform stirring treatment.

Then, the heating was stopped after two hours passed, and the mixture was cooled. When the mixture was cooled to 23±1° C., the stirring was also stopped, and in this state, the solution was allowed to stand for 12 hours to perform stabilizing treatment. Then, after stabilized, the supernatant was separated by filtration using a glass filter, and the obtained solid was washed with methanol and then dried under vacuum to obtain 11.8 g of a crude crystal of an oxo-titanylphthalocyanine compound.

(2) Pigmentation Treatment 10 g of the crude crystal of the oxo-titanylphthalocyanine compound obtained in the above pretreatment prior to pigmentation treatment was added and dissolved in 100 g of 97% concentrated sulfuric acid. This acid treatment was performed at 5° C. for one hour.

Next, the solution was added dropwise to 5 l of ice-cooled purified water at a rate of 10 ml/min, and the mixture was stirred at about 15±30° C. for 30 minutes and then allowed to stand for 30 minutes. Then, the solution was subjected to filtration using a glass filter to obtain a wet cake.

Subsequently, the obtained wet cake was suspended in 500 ml of methanol to wash it, and after washing, methanol was removed by filtration using a glass filter. Such washing was repeated four times. Then, the obtained wet cake was suspended in 500 ml of 20° C. purified water to wash it, and after washing, water was removed by filtration using a glass filter.

5 g of the washed wet cake was added to 0.75 g of water and 100 g of chlorobenzene, and the mixture was stirred under heating at 50° C. for 24 hours.

Then, the crystal obtained by subjecting the supernatant to filtration using a glass filter was washed with 100 ml of methanol on a funnel and then dried under vacuum at 50° C. for 5 hours, to obtain 4.5 g of a crystal of unsubstituted oxo-titanylphthalocyanine (blue powder) represented by the formula (3).

3. Evaluation of Oxo-Titanylphthalocyanine Crystal (1) Measurement of CuKα Characteristic X-Ray Diffraction Spectrum 0.3 g of the obtained oxo-titanylphthalocyanine crystal was dispersed in 5 g of tetrahydrofuran, which was then stored in a sealed system kept at a temperature of 23±1° C. under a relative humidity of 50 to 60% for 24 hours in a seated system, and then tetrahydrofuran was removed. The mixture was charged in a sample holder in a X-ray diffraction device (trade name: RINT1100, manufactured by Rigaku Corporation to measure. The obtained spectrum chart is shown in Table 7. The spectrum chart has the characteristics that there is the maximum peak at a Bragg angle (2θ±0.2°)=27.2° and no peak at 26.2°. It has been confirmed from this fact that the obtained oxo-titanylphthalocyanine crystal has a stable and predetermined crystal type. This is because the peak at a Bragg angle (2θ±0.2°)=27.2° C. is specific to the above predetermined crystal type and the peak at 26.2° is specific to a β-type crystal.

Figure 8:
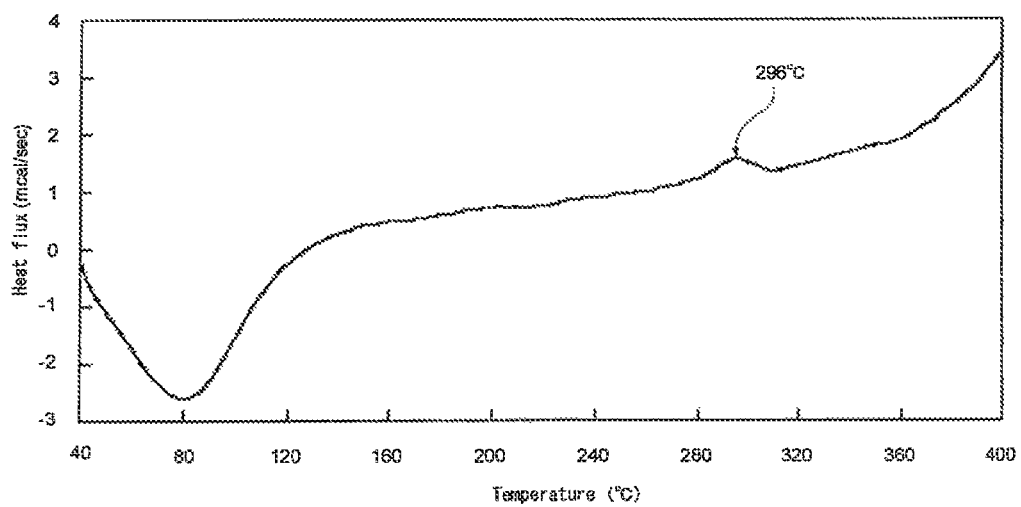
FIG. 8 is a differential scanning analysis chart of an oxo-titanylphthalocyanine crystal used in examples.

The measuring condition was as follows.
X-ray tube globe: Cu
Tube voltage: 40 kV
Tube current: 30 mA
Start angle: 3.0°
Stop angle: 40.0°
Scanning speed: 10°/min (2) Differential Scanning Calorimetric Analysis The obtained oxo-titanylphthalocyanine crystal was subjected to differential scanning calorimetric analysis using a differential scanning calorimeter (tradename: TAS-200 model, DSC8230D, manufactured by Rigaku Corporation). The obtained differential scanning analysis chart is shown in FIG. 8. In this chart, other than a peak derived from vaporization of adsorbed water, one peak was confirmed at 296° C.

The measuring condition was as follows.
Sample pan: made of aluminum
Temperature rise rate: 20° C./min
(3) Measurement of Absorbance 0.1 g (1.25 parts by weight) of the obtained oxo-titanylphthalocyanine crystal was added to 8 g (100 parts by weight) of a mixed solvent constituted of methanol and N,N-dimethylformamide (methanol:N,N-dimethylformamide=1:1 (by weight ratio). The mixture was stirred at a rotational speed of 100 rpm for one hour while keeping a temperature of 23° C. to obtain a suspension. Then, the obtained suspension was subjected to filtration using a PTFE type 0.1-μm membrane filter (manufactured by Advantest Corporation) to obtain a filtrate. Subsequently, the obtained filtrate was stored in a cell having a length, of 10 mm to measure absorbance of the filtrate for light having a wavelength of 400 nm by using an absorptiometer (trade name: Spectrophotometer U3000, manufactured by HITACHI, Ltd.). The obtained results are shown in Table 1.

4. Production of an Electrophotographic Photoreceptor (1) Formation of Intermediate Layer 250 parts by weight of titanium oxide (trade name: MT-02, manufactured by Tayca Corporation, surface treated with alumina, silica and silicone, number average primary particle diameter: 10 nm), 100 parts by weight of a quaternary copolymer polyamide resin (trade name: CM8000, manufactured by Toray Industries, Inc.) and a solvent consisting of 1000 parts by weight of methanol and 250 parts by weight of n-butanol were mixed and dispersed for 5 hours. The dispersion was further subjected to filtration using a 5-μ filter to prepare an intermediate layer application liquid.

Then, an aluminum substrate (support substrate) of 30 mm in diameter and 238.5 mm in length was dipped in the obtained intermediate layer application liquid at a rate of 5 mm/sec in such a manner that one end of the substrate faced upward, to apply the application liquid. Thereafter, curing treatment was performed at 130° C. for 30 minutes to form an intermediate layer having a film thickness of 2 μm.

(2) Formation of Charge Generating Layer

Then, 250 parts by weight of the oxo-titanylphthalocyanine crystal produced in the above manner as a charge generating agent, 100 parts by weight of a polyvinylbutyral resin as a binding resin and 8000 parts by weight of tetrahydrofuran as a dispersing medium were mixed and dispersed for 48 hours by using a beads mill to obtain a charge generating layer application liquid. The obtained application liquid was subjected to filtration using a 3-μ filter, and then the filtrate application liquid was applied to the intermediate layer by a dip coat method, followed by drying at 80° C. for 5 minutes to form a charge generating layer of 0.2 μm in film thickness.

(3) Formation of Charge Transfer Layer

Next, stored in an ultrasonic dispersing machine are 55 parts by weight of a compound (HTM-1) represented by the following formula (7) as a hole transfer agent, 5 parts by weight of methaterphenyl as an additive, 60 parts by weight of a polycarbonate resin having a viscosity average molecular weight of 20,000 and 40 parts by weight of a polycarbonate resin having a viscosity average molecular weight of 50,000 as binding resins and 310 parts by weight of tetrahydrofuran and 310 parts by weight of toluene as solvents. The mixture was subjected to dispersing treatment performed for 10 minutes, to obtain a charge transfer layer application liquid.

The obtained charge transfer layer application liquid was applied to the surface of the charge generating layer in the same manner as in the case of the charge generating layer application liquid and dried at 120° C. for 30 minutes to form a charge transfer layer of 20 μm in film thickness, thereby manufacturing a laminate type electrophotographic photoreceptor.

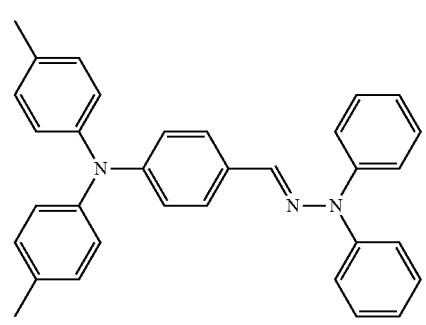

(HTM-1)

(7)

5. Evaluation (1) Measurement of Sensitivity

The sensitivity of the obtained photographic photoreceptor was measured.

Specifically, using a drum sensitivity tester (manufactured by GENTEC Inc.), the electrophotographic photoreceptor was charged such that the surface potential of the photoreceptor became −850 V. Then, the surface of the electrophotographic photoreceptor was exposed to monochromatic light (half value width: 20 nm, light intensity: $1.0\,\mu J/cm^2$) having a wavelength of 780 nm which light was extracted from white light by using a bandpass filter (irradiation time: 50 msec). Subsequently, the potential of the surface of the photoreceptor was measured as the sensitivity 350 msec after the surface of the photoreceptor was exposed to light. The results are shown in Table 1. The measured potential takes on a negative value and therefore, the absolute value of the measured potential is described in Table 1.

(2) Measurement of Charge Retention Rate

The charge retention rate of the obtained photographic photoreceptor was measured.

Specifically, using a drum sensitivity tester (manufactured by GENTEC Inc.), the electrophotographic photoreceptor was charged such that the surface potential of the photoreceptor became −850 V. Then, the potential of the surface of the photoreceptor was measured one second after the surface of the photoreceptor was charged, to measure a charge retention rate (%). The results are shown in Table 1.

Example 2

In Example 2, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet care was washed three times with methanol and then twice with water. The obtained results are shown in Table 1. The results of the CuKα characteristic X-ray diffraction spectrum and differential scanning calorimetric analysis of the obtained oxo-titanylphthalocyanine crystal were the same as those of Example 1.

Example 3

In Example 3, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet cake was washed twice with methanol and then three times with water. The obtained results are shown in Table 1. The results of the CuKα characteristic X-ray diffraction spectrum and differential scanning calorimetric analysis of the obtained oxo-titanylphthalocyanine crystal were the same as those of Example 1.

Example 4

In Example 4, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet cake was washed once with methanol and then four times with water. The obtained results are shown in Table 1. The results of the CuKα characteristic X-ray diffraction spectrum and differential scanning calorimetric analysis of the obtained oxo-titanylphthalocyanine crystal were the same as those of Example 1.

Comparative Example 1

In Comparative Example 1, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet cake was not washed with methanol but washed five times with 60° C. water. The obtained results are shown in Table 1. The results of the CuKα characteristic X-ray diffraction spectrum and differential scanning calorimetric analysis of the obtained oxo-titanylphthalocyanine crystal were the same as those of Example 1.

Comparative Example 2

In Comparative Example 2, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet cake was not washed with methanol but washed three times with 60° C. water. The obtained results are shown in Table 1. The results of the CuKα characteristic X-ray diffraction spectrum and differential scanning calorimetric analysis of the obtained oxo-titanylphthalocyanine crystal were the same as those of Example 1.

Comparative Example 3

In Comparative Example 3, an oxo-titanylphthalocyanine crystal was produced and also, an electrophotographic photoreceptor was produced to evaluate in the same manner as in Example 1 except that in the pigmentation treatment when the oxo-titanylphthalocyanine crystal was produced, the wet cake was not washed with methanol but washed three times with 20° C. water. The obtained results are shown in Table 1. The results of the CuKα characteristic X-ray diffraction spectrum and differential scanning calorimetric analysis of the obtained oxo-titanylphthalocyanine crystal were the same as those of Example 1.

TABLE 1

|  | Absorbance $\lambda = 400$ nm | Absolute value of sensitivity (V) | Charge retention rate (%) |
|---|---|---|---|
| Example 1 | 0.012 | 47 | 99.4 |
| Example 2 | 0.038 | 56 | 98.4 |
| Example 3 | 0.052 | 55 | 98.6 |
| Example 4 | 0.062 | 55 | 99.2 |
| Comparative Example 1 | 0.095 | 63 | 96.9 |
| Comparative Example 2 | 0.110 | 68 | 95.6 |
| Comparative Example 3 | 0.201 | 65 | 95.7 |

According to the present invention, an oxo-titanylphthalocyanine crystal which is stable and has excellent dispersibility can be obtained in such a manner that a wet cake which is an intermediate product is washed with a predetermined alcohol in the course of production of the oxo-titanylphthalocyanine crystal having predetermined optical characteristics and thermal characteristics.

According to the method for producing oxo-titanylphthalocyanine crystal of the present invention, it is possible to stably produce an oxo-titanylphthalocyanine crystal which is stable and has excellent dispersibility in the photoreceptive layer.

Therefore, the electrophotographic photoreceptor using the oxo-titanylphthalocyanine crystal as the charge generating agent is expected to contribute to improvement in electric properties and to stabilization of qualities in various image forming devices such as copying machines and printers.

What is claimed is:

1. An oxo-titanylphthalocyanine crystal having main diffraction peaks at a Bragg angle (2θ±0.2°)=9.5° and 27.2° in a CuKα characteristic X-ray diffraction spectrum and one peak in a temperature range from 270 to 400° C. other than the peak derived from vaporization of adsorbed water in differential scanning calorimetric analysis, the oxo-titanylphthalocyanine crystal having the absorbance for light which is within a range from 0.01 to 0.08 in a wavelength of 400 nm and which is measured for a filtrate obtained by filtering of a suspension including the oxo-titanylphthalocyanine crystal, when adding the oxo-titanylphthalocyanine crystal in an amount by weight of 1.25 parts based on 100 parts by weight of a mixed solvent of methanol and N,N-dimethylformamide (methanol:N,N-dimethylformamide=1:1 (by weight ratio)) to prepare the suspension, and the oxo-titanylphthalocyanine crystal being produced by a production method comprising the following steps (a)' to (d):

(a)' a step of performing a pre-acid treatment in which an oxo-titanylphthalocyanine compound produced in the presence of a urea compound is added in an aqueous organic solvent which is at least one type selected from the group consisting of alcohols, N,N-dimethylformamides, propionic acid, acetic acid, N-methylpyrrolidone and ethylene glycol, the mixture is stirring in the condition of a fixed temperature of about 70 to 200° C. for about 1 to 3 hours and stabilizing in an aqueous organic solvent in the condition of a fixed temperature range of about 10 to 50° C. for 5 to 15 hours;

(a) a step of dissolving a crude oxo-titanylphthalocyanine crystal in an acid to obtain an oxo-titanylphthalocyanine solution;

(b) a step of adding the oxo-titanylphthalocyanine solution dropwise in a poor solvent to obtain a wet cake;

(c) a step of washing the wet cake with an alcohol having 1 to 4 carbon atoms; and (d) a step of stirring the washed wet cake under heating in a nonaqueous solvent to obtain an oxo-titanylphthalocyanine crystal.

2. The oxo-titanylphthalocyanine crystal according to claim 1, wherein the acid used in the step (a) is at least one type selected from the group consisting of concentrated sulfuric acid, trifluoroacetic acid and sulfonic acid.

3. The oxo-titanylphthalocyanine crystal according to claim 1, where the poor solvent used in the step (b) is water.

4. The oxo-titanylphthalocyanine crystal according to claim 1, wherein the alcohol having 1 to 4 carbon atoms which is used in the step (c) is at least one type selected from the group consisting of methanol, ethanol and 1-propanol.

5. The oxo-titanylphthalocyanine crystal according to claim 1, wherein the wet cake was washed with the alcohol having 1 to 4 carbon atoms, and further washed with water in the step (c).

6. The oxo-titanylphthalocyanine crystal according to claim 1, wherein the oxo-titanylphthalocyanine crystal has a main diffraction peak at a Bragg angle $(2\theta\pm0.2°)=27.2°$ in the CuKα characteristic X-ray diffraction spectrum measured after it is dipped in an organic solvent for 24 hours and no peak at 26.2°.

7. The oxo-titanylphthalocyanine crystal according to claim 1, wherein the oxo-titanylphthalocyanine crystal has no peak at a Bragg angle $(2\theta\pm0.2°)=26.2°$ in the CuKα characteristic X-ray diffraction spectrum.

8. The oxo-titanylphthalocyanine crystal according to claim 1, wherein the oxo-titanylphthalocyanine crystal has a largest diffract peak at a Bragg angle $(2\theta\pm0.2°)=9.5°$ in the CuKα characteristic X-ray diffraction spectrum.

* * * * *